United States Patent
Gu et al.

(10) Patent No.: US 11,962,175 B2
(45) Date of Patent: Apr. 16, 2024

(54) ELECTRONIC DEVICE TO WIRELESSLY RECEIVE POWER AND OPERATING METHOD THEREOF

(71) Applicant: SAMSUNG ELECTRONICS CO., LTD., Suwon-si (KR)

(72) Inventors: Beomwoo Gu, Suwon-si (KR); Kangho Byun, Suwon-si (KR); Hyunseok Shin, Suwon-si (KR); Sungku Yeo, Suwon-si (KR); Youngho Ryu, Suwon-si (KR); Chongmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 446 days.

(21) Appl. No.: 17/085,117

(22) Filed: Oct. 30, 2020

(65) Prior Publication Data

US 2021/0376642 A1 Dec. 2, 2021

(30) Foreign Application Priority Data

May 27, 2020 (KR) .......................... 10-2020-0063514

(51) Int. Cl.
  *H02J 7/00* (2006.01)
  *H02J 7/02* (2016.01)
  (Continued)

(52) U.S. Cl.
  CPC ........ *H02J 7/00308* (2020.01); *H02J 7/0047* (2013.01); *H02J 7/02* (2013.01); *H02J 50/12* (2016.02); *H02J 50/80* (2016.02)

(58) Field of Classification Search
  CPC ........ H02J 7/00308; H02J 7/0047; H02J 7/02; H02J 50/80; H02J 50/12
  (Continued)

(56) References Cited

U.S. PATENT DOCUMENTS

| | | | |
|---|---|---|---|
| 2012/0050931 A1* | 3/2012 | Terry ...................... | H02J 50/12 361/91.1 |
| 2012/0223591 A1* | 9/2012 | Cheon ..................... | H02J 50/70 307/104 |

(Continued)

FOREIGN PATENT DOCUMENTS

| | | |
|---|---|---|
| KR | 10-2018-0075342 | 7/2018 |
| KR | 10-2018-0081950 | 7/2018 |
| WO | 2016/138241 | 9/2016 |

OTHER PUBLICATIONS

International Search Report and Written Opinion dated Feb. 23, 2021 in corresponding International Application No. PCT/KR2020/015327.

*Primary Examiner* — Alexis B Pacheco
(74) *Attorney, Agent, or Firm* — Nixon & Vanderhye P.C.

(57) ABSTRACT

According to an embodiment, an electronic device may include a battery, a resonance circuit, a rectifier, a DC/DC converter, a charger, a switch, an overvoltage protection circuit configured to perform an overvoltage protection operation or to stop the overvoltage protection operation based on the voltage at the output terminal of the rectifier, a control circuit, and a communication circuit, and the control circuit may be configured to: based on a periodic repetition of a performance of the overvoltage protection operation and a stop of the overvoltage protection while the switch is in an off state, identify a first period during which the overvoltage protection operation is stopped, based on the first period, identify an expected voltage at an output terminal of the rectifier, to be expected, wherein the expected voltage is a voltage if the switch is in an on state, based on the expected voltage, identify whether an occurrence of an overvoltage is expected if the switch is in the on state, and control the communication circuit to transmit a communication signal (Continued)

including information about whether the occurrence of the overvoltage is expected.

10 Claims, 21 Drawing Sheets

(51) Int. Cl.
*H02J 7/14* (2006.01)
*H02J 50/12* (2016.01)
*H02J 50/80* (2016.01)

(58) Field of Classification Search
USPC .......................................................... 320/108
See application file for complete search history.

(56) References Cited

U.S. PATENT DOCUMENTS

| | | | |
|---|---|---|---|
| 2012/0293009 A1* | 11/2012 | Kim | H02H 7/1252 307/104 |
| 2012/0326509 A1* | 12/2012 | McSheffrey | H02J 3/14 307/39 |
| 2014/0063666 A1* | 3/2014 | Kallal | H02H 9/04 361/56 |
| 2014/0265610 A1* | 9/2014 | Bakker | G05B 13/0205 307/104 |
| 2015/0042170 A1* | 2/2015 | Makita | H02J 50/80 307/104 |
| 2016/0111892 A1 | 4/2016 | Joehren | |
| 2016/0204642 A1* | 7/2016 | Oh | H02J 50/60 320/108 |
| 2016/0294180 A1 | 10/2016 | Pagano et al. | |
| 2018/0219428 A1* | 8/2018 | Bae | H02J 50/90 |
| 2019/0027969 A1 | 1/2019 | Staring et al. | |
| 2019/0148987 A1* | 5/2019 | Jung | H02J 50/10 307/104 |
| 2019/0265665 A1 | 8/2019 | Andronic | |
| 2019/0372331 A1* | 12/2019 | Liu | H02H 3/023 |
| 2020/0136510 A1 | 4/2020 | Nam | |
| 2021/0367456 A1* | 11/2021 | Toula | H02J 7/00308 |
| 2023/0040473 A1* | 2/2023 | Gu | H02J 7/00308 |

* cited by examiner

ELECTRONIC DEVICE TO WIRELESSLY RECEIVE POWER AND OPERATING METHOD THEREOF

CROSS-REFERENCE TO RELATED APPLICATION

This application is based on and claims priority under 35 U.S.C. § 119 to Korean Patent Application No. 10-2020-0063514, filed on May 27, 2020, in the Korean Intellectual Property Office, the disclosure of which is incorporated by reference herein in its entirety.

BACKGROUND

Field

The disclosure relates to an electronic device to wirelessly receive a power and an operating method thereof.

Description of Related Art

For many people in modern times, portable digital communication devices have become essential items. Consumers want to be provided with various high quality services they want regardless of time or place. In addition, due to the recent development of Internet of Things (IoT), various sensors, home appliances, communication devices, etc., existing in our lives are being united via networking. In order to smoothly operate these various sensors, a wireless power transmission system is required. An electronic device to wirelessly receive a power may be implemented with a large-scale electronic device such as a robot, a vacuum cleaner, and/or the like as well as a small-scale electronic device such as a Bluetooth earphone, a wearing device, a smart phone, and/or the like.

Wireless power transmission schemes include a magnetic induction scheme, a magnetic resonance scheme, and an electromagnetic wave scheme. The magnetic induction scheme or the magnetic resonance scheme is advantageous for charging an electronic device which is located at a relatively short distance from a wireless power transmission device. The electromagnetic wave scheme is advantageous for remote power transmission up to several meters compared with the magnetic induction scheme or the magnetic resonance scheme. The electromagnetic wave scheme is mainly used for remote power transmission, and may identify an exact location of a remote power receiver and transmit power most efficiently.

The electronic device may include a component for overvoltage protection. If a wireless power transmission device wirelessly transmits a power of a relatively large magnitude, an overvoltage may be applied to the electronic device (e.g., an output terminal of a rectifier of the electronic device). If the overvoltage is applied, the electronic device may be damaged, so an overvoltage protection operation may be performed in the electronic device.

In addition, the electronic device may report an occurrence of the overvoltage to the wireless power transmission device, and the wireless power transmission device may decrease a magnitude of a transmitted power in response to the report.

Before staring charging, an electronic device may be configured not to connect a circuit (e.g., a resonance circuit, a rectifier, etc.) for wireless power reception and a load (e.g., a battery, a charger, etc.). If a wireless power transmission device wirelessly transmits a power of a first magnitude, a voltage applied in the electronic device in a case that the load is not connected in the electronic device may be greater than a voltage in a case that the load is connected. If the electronic device enters a charging area of the wireless power transmission device in a state in which the load is not connected, there is a possibility that it is identified that an overvoltage occurs because the load is not connected even though it is not identified that the overvoltage occurs in a state in which the load is actually connected. Accordingly, in spite of a fact that a stability is guaranteed during actual charging, a case that the wireless power transmission device needs to decrease a magnitude of a transmitted power may occur. There is a possibility that a magnitude of a power output from the wireless power transmission device is limited to a range in which the overvoltage does not occur in a state in which the electronic device is not connected to the load.

SUMMARY

Embodiments of the disclosure may provide an electronic device capable of predicting whether an overvoltage occurs if a load is connected in a state in which the load is not connected and an operating method thereof.

According to an example embodiment, an electronic device may include: a battery, a resonance circuit configured to wirelessly receive a power, a rectifier configured to rectify an AC power provided from the resonance circuit into a DC power, a DC/DC converter configured to convert the DC power provided from the rectifier to output a converted power, a charger configured to charge the battery using the converted power provided from the DC/DC converter, a switch configured to selectively connect the rectifier and the DC/DC converter, an overvoltage protection circuit configured to perform an overvoltage protection operation based on a voltage at an output terminal of the rectifier being greater than or equal to a first threshold voltage, and to stop the overvoltage protection operation based on the voltage at the output terminal of the rectifier being less than or equal to a second threshold voltage after the overvoltage protection operation is performed, a control circuit, and a communication circuit, wherein the control circuit may be configured to, based on a periodic repetition of a performance of the overvoltage protection operation and a stop of the overvoltage protection operation while the switch is in an off state, identify a first period during which the overvoltage protection operation is stopped, identify an expected voltage at an output terminal of the rectifier to be expected, wherein the expected voltage is a voltage at the output terminal of the rectifier if the switch is in an on state, based on the expected voltage, identify whether an occurrence of an overvoltage is expected if the switch is in the on state, and control the communication circuit to transmit a communication signal including information about whether the occurrence of the overvoltage is expected.

According to an example embodiment, an electronic device may include: a battery, a resonance circuit configured to wirelessly receive a power, a rectifier configured to rectify an AC power provided from the resonance circuit into a DC power, a DC/DC converter configured to convert the DC power provided from the rectifier to output a converted power, a charger configured to charge the battery using the converted power provided from the DC/DC converter, a switch configured to selectively connect the rectifier and the DC/DC converter, an overvoltage protection circuit configured to perform an overvoltage protection operation based on a voltage at an output terminal of the rectifier being greater than or equal to a first threshold voltage, and to stop the overvoltage protection operation based on the voltage at the output terminal of the rectifier being less than or equal to a second threshold voltage after the overvoltage protection operation is performed, and a control circuit, wherein the control circuit may be configured to, based on a periodic repetition of a performance of the overvoltage protection operation and a stop of the overvoltage protection operation while the switch is in an off state, identify a first period during which the overvoltage protection operation is stopped, based on the first period, identify strength of a magnetic field corresponding to a position of the electronic device, and perform an operation corresponding to the identified strength of the magnetic field.

According to an example embodiment, an electronic device may include: a battery, a resonance circuit configured to wirelessly receive a power, a rectifier configured to rectify an AC power provided from the resonance circuit into a DC power, a DC/DC converter configured to convert the DC power provided from the rectifier to output a converted power, a charger configured to charge the battery using the converted power provided from the DC/DC converter, a switch configured to selectively connect the rectifier and the DC/DC converter, an overvoltage protection circuit configured to perform an overvoltage protection operation based on a voltage at an output terminal of the rectifier being greater than or equal to a first threshold voltage, and to stop performing the overvoltage protection operation based on the voltage at the output terminal of the rectifier being less than or equal to a second threshold voltage after the overvoltage protection operation is performed, and a control circuit, wherein the control circuit may be configured to, based on a periodic repetition of a performance of the overvoltage protection operation and a stop of the overvoltage protection operation while the switch is in an on state, identify a first period during which the overvoltage protection operation is stopped, based on the first period, identify an equivalent voltage of the electronic device, and perform an operation corresponding to the equivalent voltage.

According to an example embodiment, an electronic device may include: a battery, a resonance circuit configured to wirelessly receive a power, a rectifier configured to rectify an AC power provided from the resonance circuit into a DC power, a DC/DC converter configured to convert the DC power provided from the rectifier to output a converted power, a charger configured to charge the battery using the converted power provided from the DC/DC converter, a switch configured to selectively connect the rectifier and the DC/DC converter, an overvoltage protection circuit configured to perform an overvoltage protection operation based on a voltage at an output terminal of the rectifier being greater than or equal to a first threshold voltage, and to stop the overvoltage protection operation based on the voltage at the output terminal of the rectifier being less than or equal to a second threshold voltage after the overvoltage protection operation being performed, and a control circuit, wherein the control circuit may be configured to, based on a periodic repetition of a performance of the overvoltage protection operation and a stop of the overvoltage protection operation while the switch is in an off state, based on a first period being a period during which the overvoltage protection operation is stopped, perform at least one operation corresponding to an occurrence of an overvoltage, and based on the periodic repetition of the performance of the overvoltage protection operation and the stop of the overvoltage protection operation while the switch is in the off state, based on a second period different from the first period being the period during which the overvoltage protection operation is stopped, suspend the performing of the at least one operation corresponding to the occurrence of the overvoltage.

According to an example embodiment, an electronic device may include: a reception IC configured to wirelessly receive a power and to rectify the power into a DC power, at least one load, a switch configured to selectively connect the reception IC and the at least one load, a control circuit, and a communication circuit. The reception IC may be configured to perform an overvoltage protection operation based on a voltage at an output terminal of the reception IC being greater than or equal to a first threshold voltage, and to stop the overvoltage protection operation based on the voltage at the output terminal of the reception IC being less than or equal to a second threshold voltage after the overvoltage protection operation is performed. The control circuit may be configured to, based on a periodic repetition of a performance of the overvoltage protection operation and a stop of the overvoltage protection operation while the switch is in an off state, identify a first period during which the overvoltage protection operation is stopped, based on the first period, identify an expected voltage at an output terminal of the reception IC to be expected as a voltage at the output terminal based on the switch being in an on state, based on the expected voltage, identify whether an overvoltage is expected to occur based on the switch being in the on state, and control the communication circuit to transmit a communication signal including information about whether an occurrence of the overvoltage is expected based on the switch being in the on state.

According to an example embodiment, an electronic device may include: a reception IC configured to wirelessly receive a power and to rectify the power into a DC power, a DC/DC converter configured to process a power from the reception IC, a control circuit, and a communication circuit. The reception IC may be configured to perform an overvoltage protection operation based on a voltage at an output terminal of the reception IC being greater than or equal to a first threshold voltage, and to stop the overvoltage protection operation based on the voltage at the output terminal of the reception IC being less than or equal to a second threshold voltage after the overvoltage protection operation is performed. The control circuit may be configured to, based on a periodic repetition of a performance of the overvoltage protection operation and a stop of the overvoltage protection operation while the DC/DC converter does not output a power, identify a first period during which the overvoltage protection operation is stopped, based on the first period, identify an expected voltage at an output terminal of the reception IC to be expected as a voltage at the output terminal of the reception IC when the DC/DC converter outputs the power, based on the expected voltage, expect whether an occurrence of an overvoltage occurs based on the DC/DC converter outputting the power, and control the communication circuit to transmit a communication signal including information about whether the occurrence of the overvoltage is expected based on the DC/DC converter outputting the power.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
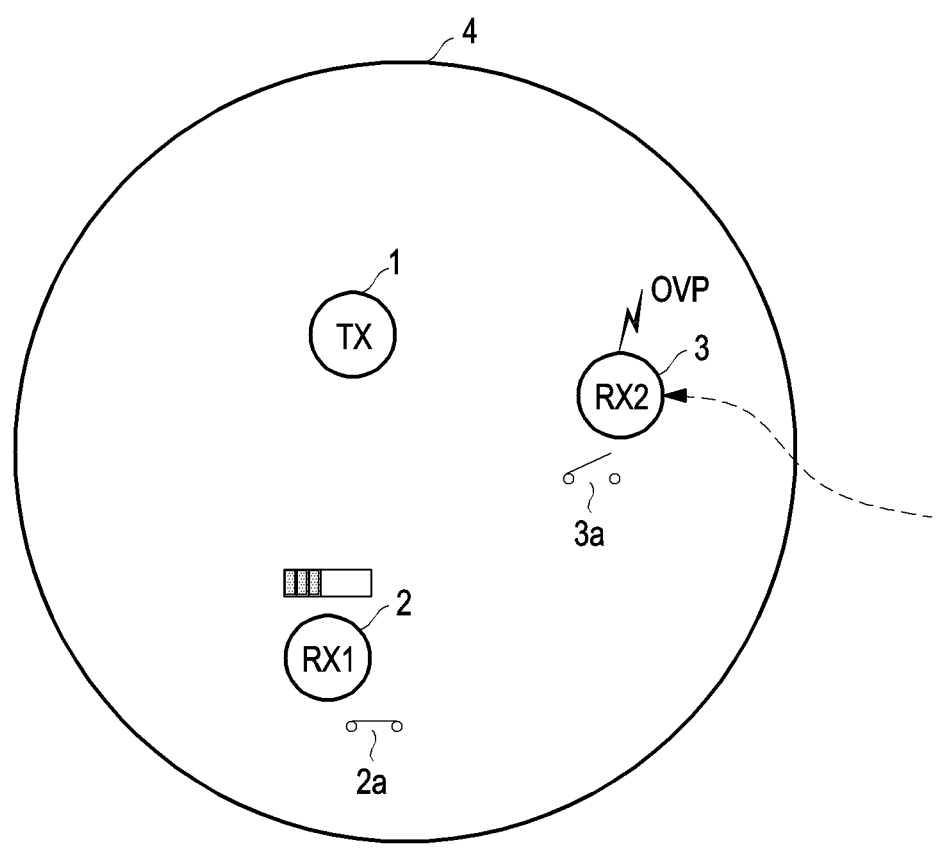
FIG. 1 is a diagram illustrating an example wireless power transmission/reception system according to an embodiment.

FIG. 1 is a diagram illustrating an example wireless power transmission/reception system 10 according to an embodiment.

The wireless power transmission/reception system 10 according to an embodiment may include a wireless power transmission device 1. The wireless power transmission/reception system 10 may include at least one electronic device, e.g., electronic devices 2 and 3 which wirelessly receive a power from the wireless power transmission device 1. The electronic devices 2, 3 may be referred to as wireless power receivers in an example in which the electronic devices 2, 3 may wirelessly receive a power.

According to an embodiment, the wireless power transmission device 1 may wirelessly transmit a power to the electronic devices 2 and 3. The wireless power transmission device 1 may transmit the power to the electronic devices 2 and 3 according to various wireless charging schemes.

For example, the wireless power transmission device 1 may transmit a power according to a resonance scheme. Adopting the resonance scheme, the wireless power transmission device 1 may include, for example, and without limitation, a power source, a direct current-alternating current (DC-AC) converting circuit, an amplifying circuit, an impedance matching circuit, at least one capacitor, at least one coil, an out-band communication circuit (e.g., a Bluetooth low energy (BLE) communication circuit), and/or the like. The at least one capacitor and the at least one coil may comprise a resonance circuit. The wireless power transmission device 1 may be implemented, for example, in a scheme defined in an Alliance for Wireless Power (A4WP) standard (or an air fuel alliance (AFA) standard). The wireless power transmission device 1 may include a coil capable of generating an induced magnetic field when a current (e.g., an AC) flows according to the resonance scheme or an induction scheme. A process in which the wireless power transmission device 1 generates a magnetic field via a coil may be expressed as the wireless power transmission device 1 outputting a wireless power, and a process in which an induced electromotive force is generated in the electronic devices 2 and 3 based on the generated magnetic field may be expressed as the electronic devices 2 and 3 receiving a wireless power. Through this process, it may be expressed that the wireless power transmission device 1 wirelessly transmits a power to the electronic devices 2 and 3. Further, the electronic devices 2 and 3 may include a coil which generates an induced electromotive force by a magnetic field which is generated around the electronic device (e.g., the coil) and whose magnitude varies over time. A process in which an AC current is output from the coil as the coil in the electronic devices 2 and 3 generates the induced electromotive force or an AC voltage is applied to the coil may be expressed as the electronic devices 2 and 3 wirelessly receiving a power.

In another example, the wireless power transmission device 1 may transmit a power according to an electromagnetic wave scheme. If the wireless power transmission device 1 adopts the electromagnetic wave scheme, the wireless power transmission device 1 may include, for example, and without limitation, a power source, a DC-AC converting circuit, an amplifying circuit, a distribution circuit, a phase shifter, an antenna array for power transmission including a plurality of antennas (e.g., a patch antenna, a dipole antenna, and/or a monopole antenna), a communication circuit of an out-band scheme (e.g., a BLE communication module), and/or the like. Each of the plurality of antennas may form a radio frequency (RF) wave. The wireless power transmission device 1 may perform beamforming by adjusting a phase and/or an amplitude of an electrical signal input to each antenna. The electronic devices 2 and 3 may include an antenna capable of outputting a current using RF waves formed around the electronic device (e.g., the antenna). A process in which the wireless power transmission device 1 forms an RF wave may be expressed as the wireless power transmission device 1 wirelessly transmitting a power. A process in which the electronic devices 2 and 3 output currents from antennas using the RF wave may be expressed as the electronic devices 2 and 3 wirelessly receiving powers.

For example, the wireless power transmission device 1 may transmit a power according to an induction scheme. Adopting the induction scheme, the wireless power transmission device 1 may include, for example, and without limitation, a power source, a DC-AC converting circuit, an amplifying circuit, an impedance matching circuit, at least one capacitor, at least one coil, a communication modulation/demodulation circuit, and/or the like. The at least one capacitor together with the at least one coil may comprise a resonance circuit. The wireless power transmission device 1 may be implemented in a scheme defined in a wireless power consortium (WPC) standard (or a Qi standard).

According to an embodiment of the disclosure, the wireless power transmission device 1 may communicate with the electronic devices 2 and 3. For example, the wireless power transmission device 1 may communicate with the electronic devices 2 and 3 according to an in-band scheme. The wireless power transmission device 1 or the electronic devices 2 and 3 may transmit data, for example, by varying a load (or impedance) according to an on/off keying modulation scheme. The wireless power transmission device 1 or the electronic devices 2 and 3 may identify data transmitted from its opposite device by measuring a change in a load (or a change in impedance) based on a change in a magnitude of a current, a voltage, or a power at a coil. For example, the wireless power transmission device 1 may communicate with the electronic devices 2 and 3 according to an out-band scheme. The wireless power transmission device 1 or the electronic devices 2 and 3 may transmit and receive data using a communication circuit (e.g., a BLE communication module) provided separately from a coil or a patch antenna. The wireless power transmission device 1 may transmit media data, and each of a plurality of different communication circuits (e.g., BLE communication modules, Wi-Fi modules, and Wi-gig modules) may transmit and receive each of media data, and a control signal for transmitting and receiving a wireless power according to implementation.

Referring to FIG. 1, the electronic device 2 may wirelessly receive power from the wireless power transmission device 1. The electronic device 2 may process (e.g., rectify, and convert (or regulate)) power from a coil included in the electronic device 2 to transfer the processed power to a load (e.g., a battery or a charger for charging the battery) of the electronic device 2. The electronic device 2 may control an internal switch 2a to be in an on state in order to transfer the processed power to the load. If the switch 2a is in the on state, the processed power may be transferred to the load, and if the switch 2a is in an off state, the processed power may not be transferred to the load. A connection position and a state control for the switch 2a will be described in greater detail below with reference to FIGS. 2A and/or 2B. The charger of the electronic device 2 may receive the processed power via the on-state switch 2a, and charge the battery using the received power.

According to an embodiment, while a switch 3a of the electronic device 3 is in an off state, the switch 3a may enter a chargeable area 4 of the wireless power transmission device 1. The off state of the switch 3a may be maintained as a default state before charging is started. If the wireless power transmission device 1 provides a power of a constant magnitude, a voltage (e.g., a voltage at an output terminal of a rectifier of the electronic device 3) measured in the electronic device 3 in a case that the switch 3a of the electronic device 3 is in the off state is higher than a voltage (e.g., a voltage at the output terminal of the rectifier of the electronic device 3) measured in the electronic device 3 in a case that the switch 3a is an on state. For example, a voltage at an output terminal of a rectifier in an electronic device may be a voltage applied to a load. The voltage applied to the load tends to increase as impedance thereof increases. A state in which the load is not connected may be a state in which impedance corresponding to the load is significantly large (theoretically, infinite). Accordingly, a voltage at the output terminal of the rectifier in a case that the load is not connected may be higher than a voltage at the output terminal of the rectifier in a case that the load is connected.

According to an embodiment, the electronic device 3 may identify an overvoltage state based on a voltage measured while the switch 3a is in the off state, and perform an overvoltage protection operation. If the electronic device 3 transmits information indicating the overvoltage state to the wireless power transmission device 1, the wireless power transmission device 1 may decrease a magnitude of a transmitted power according to identification of the over voltage state of the electronic device 3, and this causes reduction of the chargeable area 4. Due to the reduction of the chargeable area 4, the electronic device 2 which is being charged cannot perform charging, or the electronic device 2 receives a power of a decreased magnitude, thereby full charging time for the electronic device 2 may increase. The electronic device 3 may stably perform charging if the electronic device 3 is not in the overvoltage state after starting charging a load, that is, when the switch 3a is in the on state. However, as the electronic device 3 enters the chargeable area 4 in a state in which the switch 3a is in the off state, it is identified whether the electronic device 3 is in the overvoltage state based on a voltage (i.e., a voltage in a case that the switch 3a is in the off state) which is greater than a voltage on actual charging (i.e., a voltage in a case that the switch 3a is in the on state). So, even if stable charging is guaranteed during actual charging, there may be a case that a magnitude of a power transmitted by the wireless power transmission device 1 needs to be decreased. For example, there is a possibility that a magnitude of a power output from the wireless power transmission device 1 is limited to a range in which an overvoltage does not occur in a state in which the electronic device 3 is not connected to the load.

According to an embodiment, the electronic device 3 may identify whether an overvoltage state is expected based on a voltage which is expected in a state in which the load is connected, not information about a voltage actually measured in a state in which the load is not connected. The electronic device 3 may report information about whether the overvoltage state is expected to the wireless power transmission device 1. Accordingly, the wireless power transmission device 1 may receive overvoltage information expected in a state in which a load will be connected later, not overvoltage information identified based on a state in which a load is currently connected. The wireless power transmission device 1 may adjust a magnitude of a transmission power based on the overvoltage information which is expected in the state in which the load will be connected later. Accordingly, the wireless power transmission device 1 may adjust the magnitude of the transmission power based on the state in which the load will be connected later, not the state in which the load is not currently connected. For example, a magnitude of a power output from the wireless power transmission device 1 may limited to a range in which an overvoltage does not occur in a state in which the electronic device 3 is connected to a load, not a range in which the overvoltage does not occur in a state in which the electronic device 3 is not connected to the load.

Figure 2A:
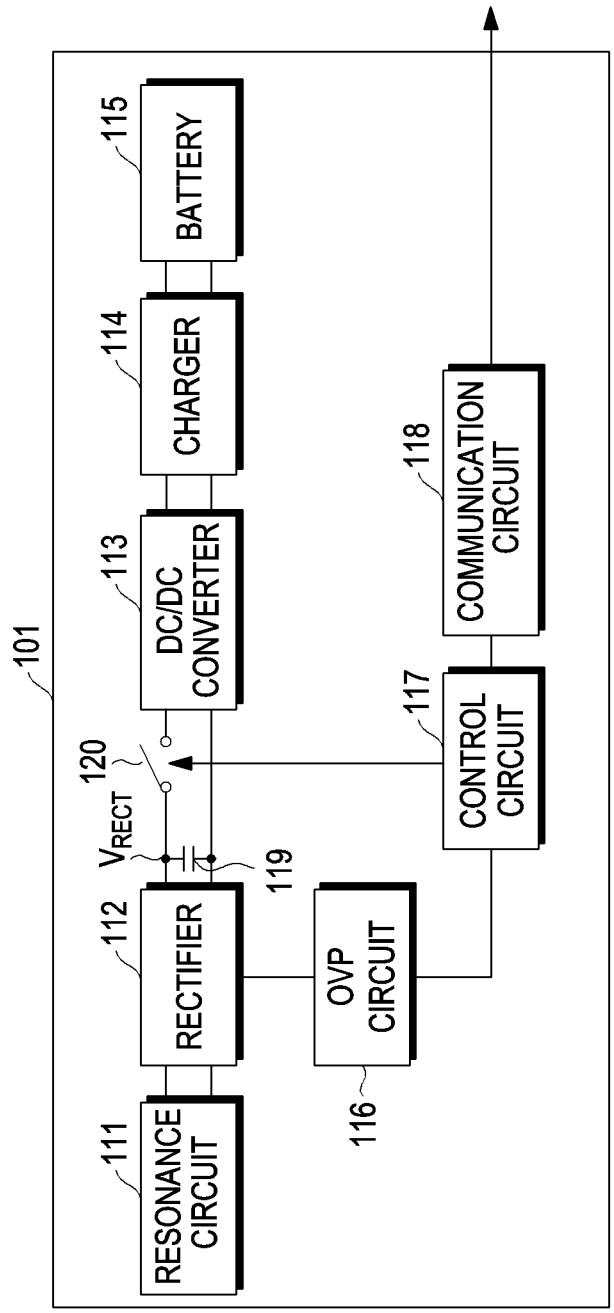
FIG. 2A is a block diagram illustrating an example electronic device according to an embodiment.

FIG. 2A is a block diagram illustrating an example electronic device according to an embodiment.

According to an embodiment, an electronic device 101 (e.g., electronic devices 2 and 3 in FIG. 1) may include at least one of a resonance circuit 111, a rectifier 112, a DC/DC converter 113, a charger 114, a battery 115, an overvoltage protection (OVP) circuit 116, a control circuit 117, a communication circuit 118, and/or a capacitor 119.

According to an embodiment, in the resonance circuit 111, a power may be generated based on a magnetic field and/or an electric field formed by a wireless power transmission device 1. An AC power may be generated in the resonance circuit 111, and the AC power may be transferred to the rectifier 112. The resonance circuit 111 may include at least one coil and at least one capacitor. There is no limitation to a structure in which at least one coil and at least one capacitor are connected.

According to an embodiment, the rectifier 112 may rectify an AC power provided from the resonance circuit 111 into a DC power. The rectifier 112 may include, for example, and without limitation, a bridge circuit (e.g., a full-bridge circuit or a half-bridge circuit). In FIG. 2A, the capacitor 119 is illustrated as being connected to an output terminal of the rectifier 112, however the bridge circuit and the capacitor 119 may also be referred to as a rectifier. For example, a rectified power may be stored in the capacitor 119 according to a switching operation of the bridge circuit, and then transferred to the DC/DC converter 113. An output voltage ($V_{RECT}$) applied to the output terminal of the rectifier 112 may be sensed to identify whether an overvoltage occurs, however the output terminal of the rectifier 112 is merely an example, and there is no limitation to a point for identifying whether the overvoltage occurs. Meanwhile, the capacitor 119 may also be used as an input capacitor for the DC/DC converter 113.

According to an embodiment, the DC/DC converter 113 may convert and/or regulate a voltage of the rectified power transferred from the rectifier 112. The DC/DC converter 113 may provide a power having a substantially constant voltage. The DC/DC converter 113 may not be included in the electronic device 101 according to an implementation example. In an embodiment in which the DC/DC converter 113 is not included, an expression "provided to the DC/DC converter 113" described in the present disclosure may be understood as an expression "provided to the charger 114", and an expression "provided from the DC/DC converter 113" may be understood as an expression "provided from the rectifier 112". The DC/DC converter 113 may be connected to at least one hardware (or a power management integrated circuit (PMIC) for providing hardware with a power) in addition to the charger 114, and the at least one hardware (or the PMIC of a corresponding hardware) may operate using a power from the DC/DC converter 113. The DC/DC converter 113 may be implemented in plural.

According to an embodiment, the charger 114 may receive power output from the DC/DC converter 113 and charge the battery 115 connected to the charger 114 using the received power. The charger 114 may control a current and/or voltage applied to the battery 115 based on various charging modes (e.g., a constant current (CC) mode, a constant voltage (CV) mode, or a fast charging mode, and/or the like). For example, the charger 114 may control the current and/or voltage applied to the battery 115 based on a charging state of the battery 115. The charger 114 may control the current and/or voltage applied to the battery 115 based on a user input. For example, if the fast charging mode is selected according to the user input, the charger 114 may control the current and/or voltage according to a setting corresponding to the fast charging mode. The battery 115 is not limited as long as it is a chargeable secondary battery.

According to an embodiment, the switch 120 may selectively connect the rectifier 112 to the DC/DC converter 113. If the switch 120 is in an on state, a power may be provided from the rectifier 112 (or the capacitor 119) to the DC/DC converter 113. Accordingly, the power may be provided to a load (e.g., the charger 114, the battery 115, and/or other hardware). If the switch 120 is in an off state, a power may not be provided from the rectifier 112 to the DC/DC converter 113. In this case, the power may not be provided to the load. For example, the on/off state of the switch 120 may be controlled by the control circuit 117. If the electronic device 101 is disposed within a chargeable area 4 of a wireless power transmission device 1, the switch 120 may be in the off state. As the switch 120 is in the off state, a state in which the load (e.g., the charger 114 and/or the battery) is not connected to at least one hardware (e.g., the resonance circuit 111, the rectifier 112, and/or the DC/DC converter 113) for wireless power transmission may be referred to as a "no-load state". In another embodiment, the electronic device 101 may not include the switch 120 independent from the DC/DC converter 113. In this case, the electronic device 101 may control a switch within the DC/DC converter 113. For example, if charging is started and performed, the electronic device 101 may control the switch within the DC/DC converter 113 to be in an on state, thereby a power from the DC/DC converter 113 may be transferred to the charger 114. For example, in the no-load state, the electronic device 101 may control the switch within the DC/DC converter 113 to be in the off state, thereby the DC/DC converter 113 and the charger 114 may not be electrically connected. It will be understood by those skilled in the art that, in the present disclosure, the control of the on/off state of the switch 120 may be replaced with the control of the on/off state of the switch within the DC/DC converter 113. A position of the switch 120 is not limited, and for example, the switch 120 may selectively connect the DC/DC converter 113 and the charger 114.

According to an embodiment, the overvoltage protection circuit 116 may operate such that no overvoltage is applied to the electronic device 101. For example, the overvoltage protection circuit 116 may operate such that the voltage ($V_{RECT}$) applied to the output terminal of the rectifier 112 is maintained below a first threshold voltage, however the output terminal of the rectifier 112 is merely an example. For example, if the ($V_{RECT}$) applied to the output terminal of the rectifier 112 is greater than or equal to (or greater than) the first threshold voltage, the overvoltage protection circuit 116 may perform an overvoltage protection operation. The overvoltage protection operation may be an operation which causes a decrease in the voltage ($V_{RECT}$) applied to the output terminal of the rectifier 112, and various overvoltage protection operations will be described in greater detail below.

According to an embodiment, the overvoltage protection circuit 116 may perform the overvoltage protection operation in a hysteresis control scheme. For example, the overvoltage protection circuit 116 may perform the overvoltage protection operation if the voltage ($V_{RECT}$) applied to the output terminal of the rectifier 112 is greater than or equal to (or greater than) the first threshold voltage, and stop performing the overvoltage protection operation if the voltage ($V_{RECT}$) applied to the output terminal of the rectifier 112 is less than or equal to (or less than) a second threshold voltage. The second threshold voltage may be less than the first threshold voltage.

Figure 3:
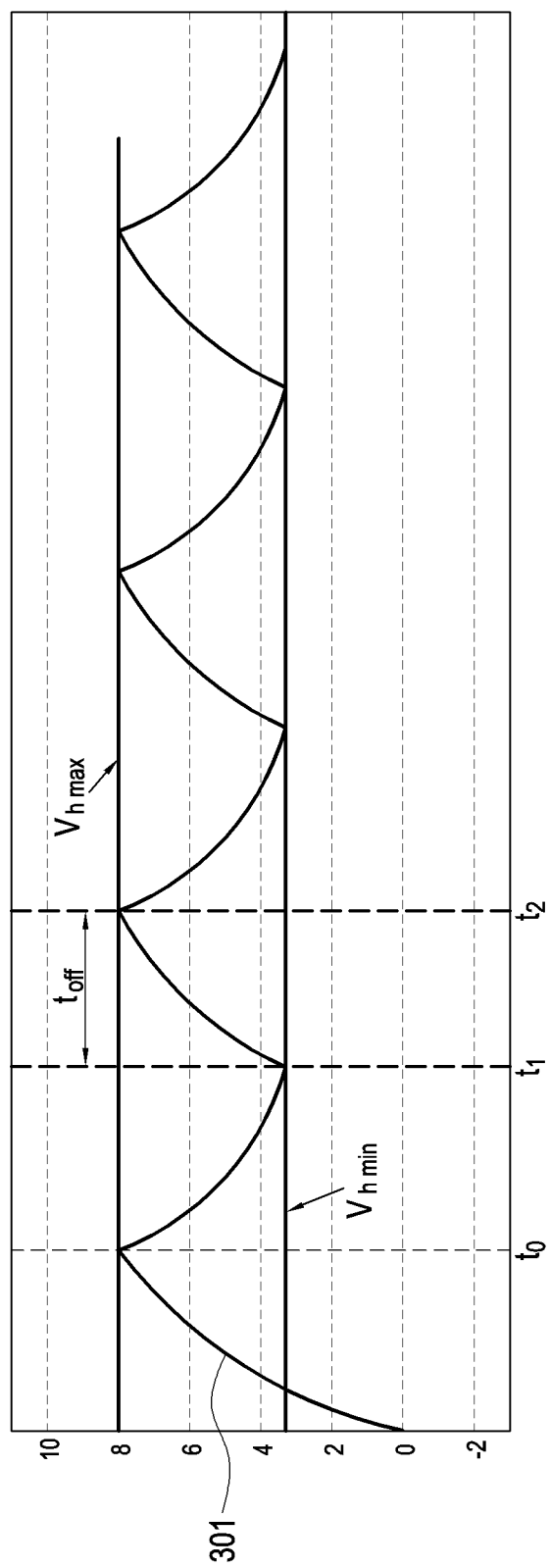
FIG. 3 is a diagram illustrating example voltages during a repetition of a performance and a stop of an overvoltage protection operation having a hysteresis characteristic according to an embodiment.

For example, referring to FIG. 3, a voltage ($V_{RECT}$) 301 applied to the output terminal of the rectifier 112 is illustrated. For example, if the electronic device 101 is disposed in the chargeable area 4 of the wireless power transmission device 1, a voltage 301 increases to reach a first threshold voltage ($V_{h\_max}$) at a time point to. The overvoltage protection circuit 116 may perform the overvoltage protection operation based on a fact that the voltage 301 is greater than or equal to the first threshold voltage ($V_{h\_max}$). As the overvoltage protection operation is performed, the voltage 301 may decrease, and reach to a second threshold voltage ($V_{h\_min}$) at a time point $t_1$. The overvoltage protection circuit 116 may stop performing the overvoltage protection operation based on a fact that the voltage 301 is less than or equal to the second threshold voltage ($V_{h\_min}$). As the overvoltage protection operation is stopped, the voltage 301 may increase again to reach the first threshold voltage ($V_{h\_max}$) at a time point $t_2$. Thereafter, the overvoltage protection circuit 116 may repeat a performance and a stop of the over voltage protection operation having a hysteresis characteristic.

In an example embodiment, the overvoltage protection circuit 116 may provide a control signal for controlling a state of an element (e.g., a switch, or a transistor) of a bridge circuit included in the rectifier 112, and the overvoltage protection circuit 116 may be implemented with a circuit independent from the control circuit 117, or may be included in the control circuit 117. In another embodiment, the overvoltage protection circuit 116 may further include a dummy load and a switch connected to the rectifier 112 as will be described in more detail below. If the rectifier 112 is implemented to have an overvoltage protection function, at least some elements of the overvoltage protection circuit 116 may be included in the rectifier 112. The overvoltage protection circuit 116 may include, for example, circuitry (e.g., a comparator) which may compare the voltage ($V_{RECT}$) at the output terminal of the rectifier 112 with each of the first threshold voltage and the second threshold voltage, however, this is merely an example. The overvoltage protection circuit 116 may be implemented to receive a comparison result from a comparator which is disposed outside the overvoltage protection circuit 116.

According to an embodiment, the control circuit 117 may expect an output voltage ($V_{RECT}$) of the rectifier 112 in a case that the switch 120 is in an on state, based on at least one value sensed while the switch 120 is in an off state, and expect whether an overvoltage occurs based on the expected output voltage ($V_{RECT}$). The control circuit 117 may identify a period (e.g., $T_{off}$ in FIG. 3) during which the overvoltage protection operation is stopped if the rectifier 112 repeats a performance and a stop of the hysteretic overvoltage protection operation. The control circuit 117 may identify the period (e.g., $T_{off}$ in FIG. 3) during which the overvoltage protection operation is stopped based on, for example, a signal (e.g. a signal for controlling a state of the bridge circuit within the rectifier 112) for the overvoltage protection operation output from the overvoltage protection circuit 116. For example, the control circuit 117 may perform sampling on a stop period based on the signal to detect the number of samplings and/or a sampling period, and identify the period (e.g., $T_{off}$ in FIG. 3) during which the overvoltage protection operation is stopped based on the number of samplings and/or the sampling period. The control circuit 117 may identify the period (e.g., $T_{off}$ in FIG. 3) during which the overvoltage protection operation is stopped based on, for example, an interruption provided to the control circuit 117 at a rising edge and/or a falling edge of the signal for the overvoltage protection operation. It will be understood by those skilled in the art that there is no limitation in a measurement scheme for the stop period (e.g., $T_{off}$ in FIG. 3) for the overvoltage protection operation described above.

According to an example embodiment, the control circuit 117 may identify a voltage ($V_{RECT}$) expected at the output terminal of the rectifier 112 in a case that the switch 120 is in the on state based on the period ($T_{off}$) during which the overvoltage protection operation is stopped. The control circuit 117 may identify the expected voltage ($V_{RECT}$) by inputting the measured period ($T_{off}$) during which the overvoltage protection operation is stopped to an equation based on the equation which outputs the expected voltage ($V_{RECT}$) with the period ($T_{off}$) during which the overvoltage protection operation is stopped as an input value. The equation may be set based on electrical values (e.g., resistance values, capacitances, and/or inductances) of various elements within the electronic device 101, predetermined constant values (e.g., a first threshold voltage, and a second threshold voltage), and/or the like, and there is no limitation to values for generating the equation. In another embodiment, the control circuit 117 may identify the expected voltage ($V_{RECT}$) based on an equation with an additional sensed value (e.g., a battery voltage, a power transferred to a load, or a period during which the overvoltage protection operation is performed, and/or the like) as an additional input value in addition to the period ($T_{off}$) during which the overvoltage protection operation is stopped, and this will be described later in more detail. The control circuit 117 may identify the expected voltage ($V_{RECT}$) based on a lookup table. The lookup table may be, for example, for a relationship between the period ($T_{off}$) during which the overvoltage protection operation is stopped and the expected voltage ($V_{RECT}$). The control circuit 117 may identify the expected voltage ($V_{RECT}$) based on the measured period ($T_{off}$) during which the overvoltage protection operation is stopped and the lookup table.

According to an embodiment, the control circuit 117 may identify whether an overvoltage state is expected if a load is connected (in a switch-on state), based on the expected voltage ($V_{RECT}$). If it is identified that the expected voltage ($V_{RECT}$) is greater than or equal to (or greater than) a threshold voltage (e.g., the first threshold voltage), the control circuit 117 may identify that the overvoltage state is expected. If it is identified that the expected voltage ($V_{RECT}$) is less than (or less than or equal to) the threshold voltage, the control circuit 117 may identify that the overvoltage state is not expected. The control circuit 117 may control the communication circuit 118 to report whether the overvoltage state is expected to the wireless power transmission device 1. If the control circuit 117 controls the communication circuit 118 to transmit a communication signal including information indicating that the overvoltage state is expected, the wireless power transmission device 1 may identify the information indicating that the overvoltage state is expected from the communication signal. The wireless power transmission device 1 may decrease, for example, a magnitude of a transmission power. If the control circuit 117 controls the communication circuit 118 to transmit a communication signal including information indicating that the overvoltage state is not expected, the wireless power transmission device 1 may identify the information indicating that the overvoltage state is not expected from the communication signal. For example, the wireless power transmission device 1 may maintain or increase the magnitude of the transmission power. The wireless power transmission device 1 may transmit a control signal instructing to start charging to the electronic device 3 which enters a chargeable area via a communication circuit of the wireless power transmission device 1. In addition, if the overvoltage state is not expected, the control circuit 117 may control the switch 120 to be in the on state to start charging. If the overvoltage state is expected, the control circuit 117 may maintain the switch 120 to be in the off state even if a control signal indicating a charge start is received from the wireless power transmission device 1.

Figure 2B:
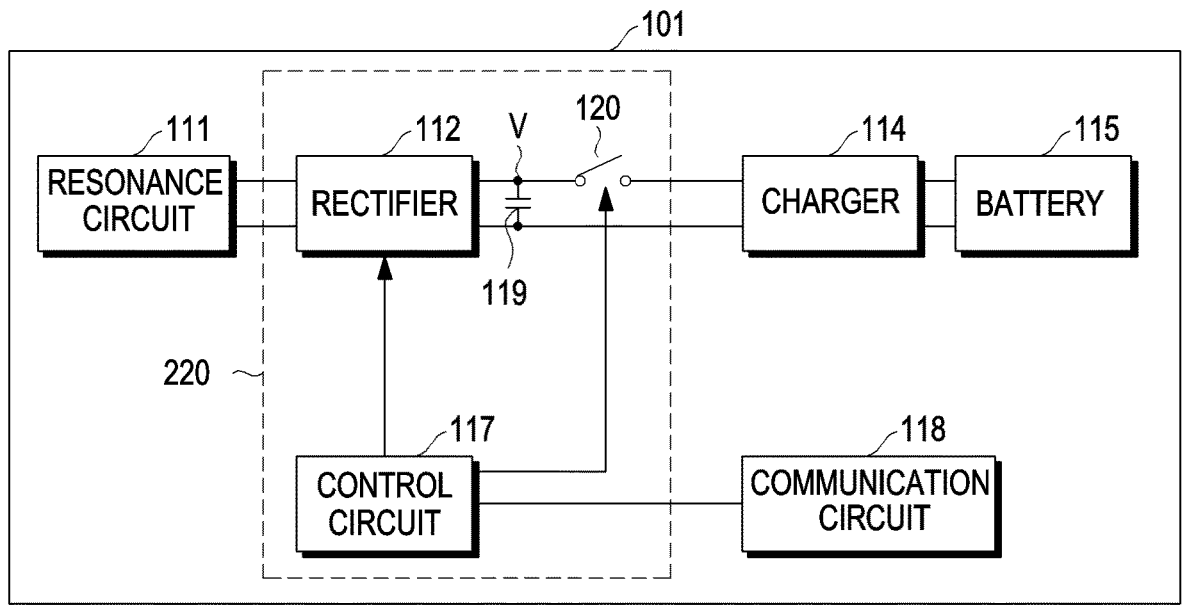
FIG. 2B is a block diagram illustrating an example electronic device according to an embodiment.

Referring to FIG. 2B, an electronic device 101 according to an embodiment may include a resonance circuit 111, a rectifier 112, a charger 114, a battery 115, a control circuit 117, a communication circuit 118, a capacitor 119, and a switch 120. As described above, the electronic device 101 according to an embodiment may be implemented not to include a DC/DC converter. In addition, the rectifier 112, the control circuit 117, the capacitor 119, and the switch 120 may be implemented as a reception integrated circuit (IC) 220. In this case, the rectifier 112 may include at least one element (e.g., a switch and a resistor) for overvoltage protection, or may be configured to perform an operation for the overvoltage protection. The reception IC 220 may be implemented to include the resonance circuit 111.

In various embodiments, the control circuit 117 may be implemented with, for example, and without limitation, a microprocessor, a micro controlling unit (MCU), or the like, however, there is no limitation thereof, or may be implemented with a set of FPGAs or analog elements, etc. The communication circuit 118 may be implemented with, for example, and without limitation, a BLE communication circuit, however, as long as it is a circuit capable of transmitting and receiving a communication signal, a communication scheme thereof is not limited.

In an embodiment according to FIG. 2B described above, the electronic device 101 may expect whether an overvoltage occurs while the switch 120 is in an on state based on a period during which the overvoltage protection operation is stopped which is identified while the switch 120 is in an off state.

Figure 2C:
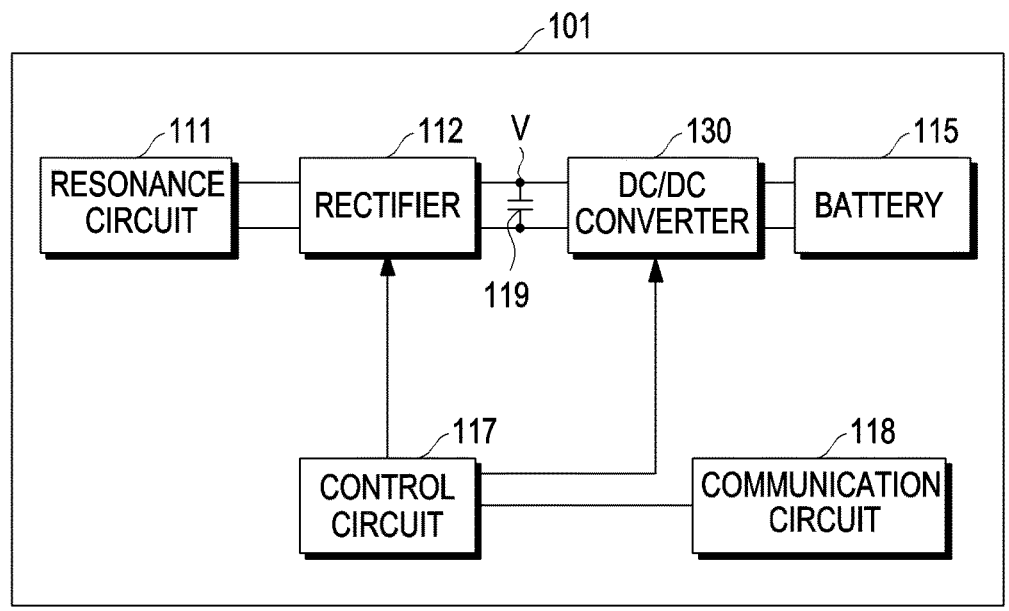
FIG. 2C is a block diagram illustrating an example electronic device according to an embodiment.

FIG. 2C is a block diagram illustrating an example electronic device according to various embodiments.

Referring to FIG. 2C, an electronic device 101 may include at least one of a resonance circuit 111, a rectifier 112, a capacitor 119, a DC/DC converter 130, a battery 115, a control circuit 117, and/or a communication circuit 118. In FIG. 2C, the electronic device 101 may be implemented not to include a switch which selectively connects the rectifier 112 and the DC/DC converter 130. In addition, in an embodiment in FIG. 2C, the battery 115 may perform charging based on a power converted by the DC/DC converter 130. The DC/DC converter 130 may process an input power to perform charging of the battery 115. Although not shown, a power from the DC/DC converter 130 may be provided to other hardware in addition to the battery 115.

The control circuit 117 may control whether to provide to the battery 115 (or other hardware) with a power from the DC/DC converter 130 by controlling the DC/DC converter 130. For example, the control circuit 117 may control the power from the DC/DC converter 130 to be provided to the battery 115 in a normal charging situation. The control circuit 117 may control the DC/DC converter 130 so that the power from the DC/DC converter 130 is not provided to the control circuit 117 before identifying an over voltage protection operation or a charging start command (or a charging start event). A state in which the DC/DC converter 130 does not output the power may be a no-load state.

In an embodiment according to FIG. 2C described above, the electronic device 101 may expect whether an overvoltage occurs while the DC/DC converter 130 provides a power based on the period during which the overvoltage protection operation is stopped which is identified while the DC/DC converter 130 does not provide the power.

Figure 4A:
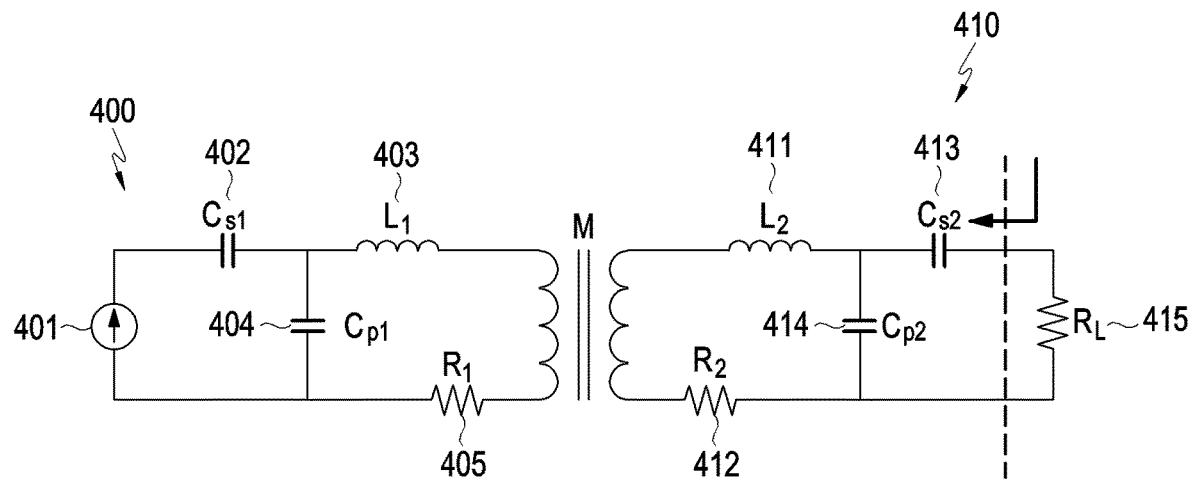
FIG. 4A is an equivalent circuit diagram illustrating an example wireless power transmission/reception system according to an embodiment.

FIG. 4A is an equivalent circuit diagram illustrating an example wireless power transmission/reception system according to an embodiment.

Referring to FIG. 4A, a wireless power transmission device 400 (e.g., a wireless power transmission device 1) according to an embodiment may include a power source 401, a capacitor 402, a coil 403, a capacitor 404, and a resistor 405. The power source 401 may output an AC power, and may include, for example, a DC/AC converter (or an inverter). At least some of the capacitor 402, the coil 403, the capacitor 404, or the resistor 405 may comprise, for example, a resonance circuit and/or an impedance matching circuit. The capacitor 402 may have a capacitance of $C_{s1}$, the coil 403 may have an inductance of $L_1$, the capacitor 404 may have a capacitance of $C_{p1}$, and the resistor 405 may have a resistance value of $R_1$, and characteristic values of each element may be set in consideration of a resonance frequency of the resonance circuit, and/or impedance matching. The capacitance of $C_{s1}$ may be, for example, a value which is matched so that an input impedance in a wireless power transmission device becomes a real value, but there is no limitation thereto. The capacitance of $C_{p1}$ may be, for example, a value which is matched to satisfy a minimum coupling coefficient and an output power specification of an electronic device at a power amplifier current, but there is no limitation thereto. At least one element may be implemented with a variable element whose characteristic value is changeable. Those skilled in the art will understand that a connection relationship among the capacitor 402, the coil 403, the capacitor 404, or the resistor 405 is merely an example.

An electronic device 410 according to an embodiment (e.g., electronic devices 2 and 3, or an electronic device 101) may include a capacitor 413, a coil 411, a capacitor 414, a resistor 412, and a load 415. A mutual induction inductance M may be formed between the wireless power transmission device 400 and the electronic device 410. At least some of the capacitor 413, the coil 411, the capacitor 414, the resistor 412, and the load 415, may comprise, for example, a resonance circuit and/or an impedance matching circuit. The capacitor 413 may have a capacitance of $C_{s2}$, the coil 411 may have an inductance of $L_2$, the capacitor 414 may have a capacitance of $C_{p2}$, and the resistor 412 may have a resistance value of $R_2$, and characteristic values of each element may be set in consideration of a resonance frequency of the resonance circuit, and/or impedance matching, and at least one element may be implemented with a changeable element whose characteristic value is changeable. The capacitance of $C_{s2}$ may be, for example, a value which is matched so that an imaginary part of an output impedance in an electronic device becomes 0, but there is no limitation thereto. The capacitance of $C_{p2}$ may have a value which is matched so that a real part of the output impedance in the electronic device has the same value as a load resistance, but there is no limitation thereto. For example, for reception of a wireless power, the capacitors 414 may be connected in parallel, but those skilled in the art will understand that a connection relationship among the capacitor 413, the coil 411, the capacitor 414, the resistor 412, and the load 415 is merely an example.

Figure 4B:
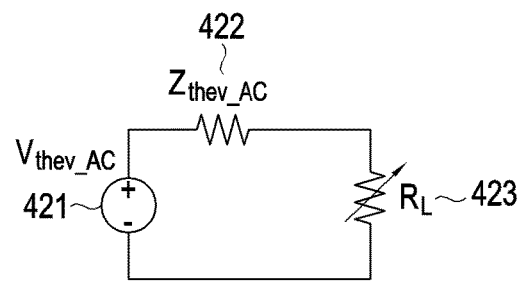
FIG. 4B is a Thevenin equivalent circuit illustrating an example electronic device as viewed from a perspective of a load of the electronic device according to an embodiment.

FIG. 4B is a Thevenin equivalent circuit illustrating an example electronic device as viewed from a perspective of a load 415 of an electronic device 410. As shown in FIG. 4B, a wireless power transmission/reception system may be interpreted as including a Thevenin equivalent power source 421 of a Thevenin voltage ($V_{thev\_AC}$), a Thevenin equivalent impedance 422 of an impedance of $Z_{thev\_AC}$, and a variable load 423 of $R_L$. As shown in FIG. 4A, as an induced electromotive force is formed in the electronic device 410 by a mutual induction inductance, in the Thevenin equivalent circuit in FIG. 4B, the electronic device 410 may be interpreted as including the Thevenin equivalent power source 421. The Thevenin equivalent impedance 422 may be designed to be matched with, for example, the relatively large resistance ($R_L$) of the variable load 423.

Figure 4C:
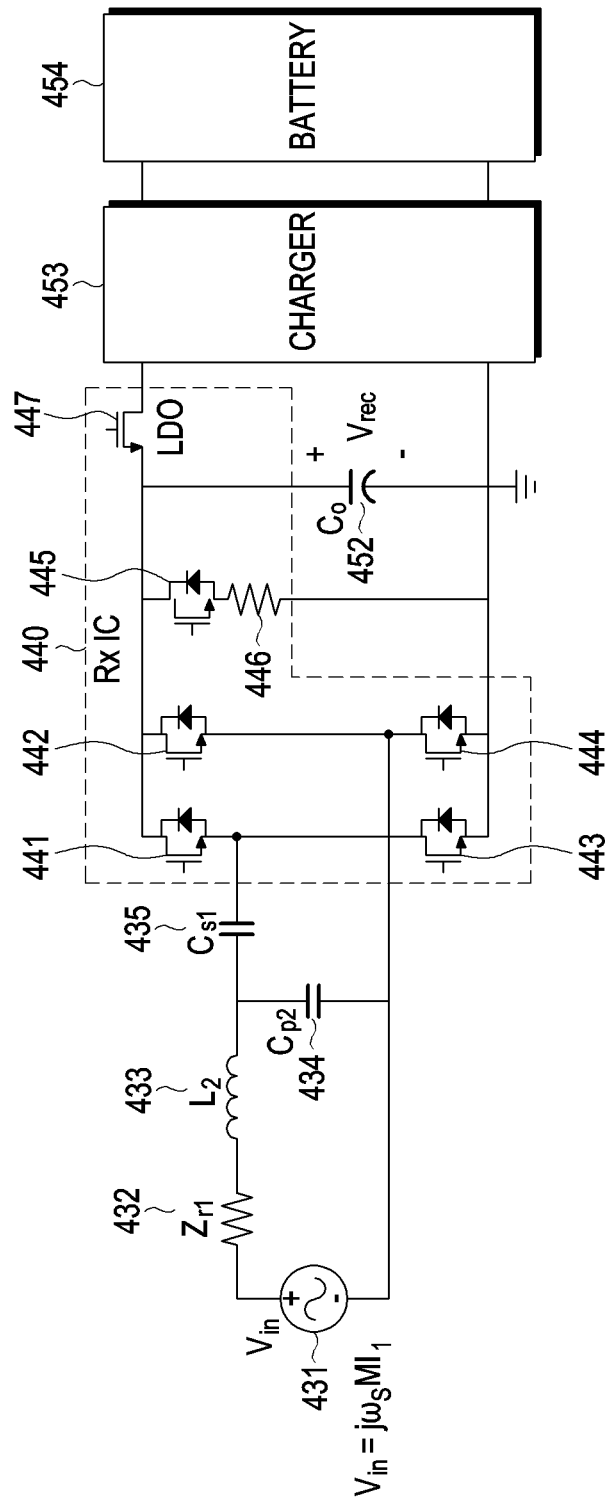
FIG. 4C is a diagram illustrating an example circuit connection of an electronic device according to an embodiment.

FIG. 4C is a diagram illustrating an example circuit connection of an electronic device according to an embodiment. FIG. 4C illustrates, for example, a detailed circuit connection for a case in which a DC/DC converter is not included, and if an electronic device 101 includes the DC/DC converter, the DC/DC converter may be connected to a capacitor 452. For example, an equivalent impedance of a wireless power transmission device 1 may not affect an analysis of a circuit because a PA having a current source characteristic is used for a transmission coil.

According to an embodiment, an electronic device 410 may be interpreted as including at least one of a power source 431, a resistor 432, a coil 433, capacitors 434 and 435, a reception IC (RX IC) 440, a capacitor 452, a charger, and/or a battery 454. The reception IC 440 may include at least one of bridge-diodes 441, 442, 443, and 444, a switch 445, a resistor 446, and/or a switch 447.

As described in FIG. 4B, the electronic device 410 may be interpreted as including the power source 431, and a voltage ($V_{ind}$) of the power source 431 may be $j\omega_2 M I_1$. Here, $\omega_s$ may refer, for example, to an angular frequency of an AC power, M may be a mutual induction inductance, and $I_1$ may be a current of a coil of a wireless power transmission device 1. The resistor 432 may have a resistance value of $Z_{r1}$, the coil 433 may have an inductance of $L_2$, and the capacitors 434 and 435 may have a capacitance of $C_{p2}$ and a capacitance of $C_{S1}$, respectively.

The bridge-diodes 441, 442, 443, and 44 may rectify an input AC power and output a DC power. A rectification operation in which the bridge-diodes 442 and 443 in a second group may be turned off while the bridge-diodes 441 and 444 in a first group are turned on, and the bridge-diodes 442 and 443 in the second group may be turned on while the bridge-diodes 441 and 444 in the first group are turned off may be performed, and there is no limitation to the rectification operation.

The reception IC 440 according to an embodiment may include a switch 445 and a resistor 446. The switch 445 and the resistor 446 may be implemented, for example, as a part of an overvoltage protection circuit 116 in FIG. 2A, but if the overvoltage protection circuit 116 is implemented as one hardware with a rectifier 112, the switch 445 and the resistor 446 may be a part of the rectifier 112. For example, if a voltage ($V_{RECT}$) (for example, a voltage applied to the capacitor 452) at an output terminal of a rectifier (the bridge-diodes 441, 442, 443, and 444) is greater than or equal to a first threshold voltage, an overvoltage protection operation (e.g. turn-on of the switch 445) may be performed, and if the voltage ($V_{RECT}$) is less than or equal to a second threshold voltage, the overvoltage protection operation may be stopped. This will be described in greater detail below with reference to FIG. 5A.

In other embodiments, the switch 445 and the resistor 446 may be replaced with, for example, variable resistors. In this case, a fact that the overvoltage protection operation is performed may be a fact that a variable resistor has a first resistance value, and a fact that the overvoltage protection operation is stopped may be a fact that the variable resistor has a second resistance value. For example, the first resistance value may be less than the second resistance value, and if the overvoltage protection operation is performed, a relatively larger current may flow to the resistor 446.

According to an embodiment, the switch 447 may be controlled to be in an on state if charging is performed, and accordingly, a power output from the reception IC 440 may be provided to the charger 453. The switch 447 may be controlled to be in an off state if the charging is not performed, that is, in a no-load state.

According to an embodiment, the charger 453 may receive a rectified power, and adjust a voltage and/or current of the rectified power to provide the voltage and/or current-adjusted power to the battery 454. The battery 454 may be charged based on the power from the charger 453.

Figure 5A:
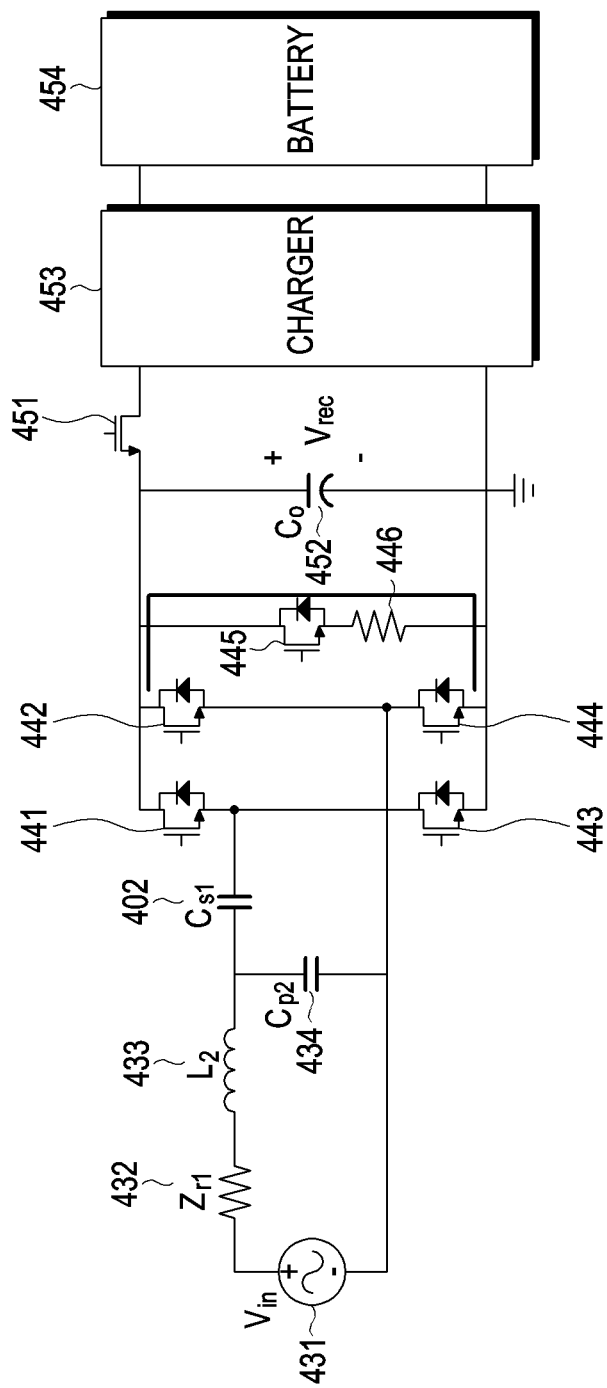
FIG. 5A is a diagram illustrating an example overvoltage protection operation according to an embodiment.

FIG. 5A is a diagram illustrating an example over voltage protection operation according to an embodiment.

According to an embodiment, as shown in FIG. 5A, an overvoltage protection operation may be an operation that a switch 445 is controlled to be in an on state. Accordingly, a current may flow through a resistor 446, and an overvoltage may not be applied to a load such as a charger 453 and a battery 454. For example, if a voltage ($V_{RECT}$) at an output terminal of a rectifier is greater than or equal to a first threshold voltage, the switch 445 may be controlled to be in the on state. For example, an overvoltage protection circuit 116 in FIG. 2A may include at least one comparator capable of comparing the voltage ($V_{RECT}$) at the output terminal of the rectifier with the first threshold voltage, or an MCU which compares the voltage ($V_{RECT}$) at the output terminal of the rectifier with the first threshold voltage in software. If the overvoltage protection circuit 116 includes the comparator, the comparator may be implemented to input a first threshold voltage and a voltage ($V_{RECT}$), and provide a signal capable of turning on the switch 445 if the voltage ($V_{RECT}$) is greater than or equal to the first threshold voltage, but there is no limitation thereto. If the overvoltage protection circuit 116 includes the MCU, the MCU may be implemented to provide the signal capable of turning on the switch 445 if the voltage ($V_{RECT}$) is greater than or equal to the first threshold voltage. Meanwhile, as described above, at least part of the overvoltage protection circuit 116 may be implemented to be included in a control circuit 117. If the voltage ($V_{RECT}$) at the output terminal of the rectifier is less than or equal to a second threshold voltage, the switch 445 may be controlled to be in the off state. For example, the overvoltage protection circuit 116 in FIG. 2A may include at least one comparator capable of comparing the voltage ($V_{RECT}$) at the output terminal of the rectifier with the second threshold voltage, or an MCU which compares the voltage ($V_{RECT}$) at the output terminal of the rectifier with the second threshold voltage in software. If the overvoltage protection circuit 116 includes the comparator, the comparator may input the second threshold voltage and the voltage ($V_{RECT}$), and provide a signal capable of turning off the switch 445 or stop proving the signal capable of turning on the switch 445 if the voltage ($V_{RECT}$) is greater than or equal to the second threshold voltage. If the overvoltage protection circuit 116 includes the MCU, the MCU may provide the signal capable of turning off the switch 445 or stop providing the signal capable of turning on the switch 445 if the voltage ($V_{RECT}$) is greater than or equal to the second threshold voltage. For example, the overvoltage protection circuit 116 may be implemented to include one comparator for an operation having a hysteresis characteristic of providing an output signal if an input value ($V_{RECT}$) is greater than or equal to the first threshold value, and stopping providing the output signal if the input value ($V_{RECT}$) is less than or equal to the second threshold voltage. The comparator may input the first threshold voltage, the second threshold voltage, and $V_{RECT}$, and output, for example, a control signal for the switch 445. The overvoltage protection circuit 116 may include a plurality of comparators each of which is capable of comparing the first threshold voltage/second threshold voltage with $V_{RECT}$.

As described above, as shown in FIG. 3, the voltage ($V_{RECT}$) may decrease during a period during which the switch 445 is turned on and may increase during a period during which the switch 445 is turned off.

According to an embodiment, the control circuit 117 may detect a rising edge of a turn-on signal (e.g., an output signal from a comparator having a hysteresis characteristic) in a case that the switch 445 is turned on. For example, the control circuit 117 may directly detect the rising edge, or detect an interrupt which is generated in response to the rising edge and received from an external device (e.g., the overvoltage protection circuit 116). The control circuit 117 may detect a falling edge of the turn-on signal (for example, the output signal from the comparator having the hysteresis characteristic) in a case that the switch 445 is turned off. For example, the control circuit 117 may directly detect the falling edge or an interrupt which is generated in response to the falling edge and received from the external device (e.g., the overvoltage protection circuit 116). Thereafter, by repetition having a hysteresis characteristic, the control circuit 117 may detect a rising edge of the turn-on signal in a case that the switch 445 is turned on. In this case, the control circuit 117 may identify difference between a time point when the switch 445 is turned off and a time point when the switch 445 is turned on again as a period ($t_{off}$) during which an overvoltage protection operation is stopped. Alternatively, the control circuit 117 may identify the period ($t_{off}$) during which the overvoltage protection operation is stopped based on a sampling result for a period during which the switch 445 is turned off. The control circuit 117 may identify a period increasing from a lower limit to an upper limit as the period ($t_{off}$) during which the overvoltage protection operation is stopped according to a sampling result for the voltage ($V_{RECT}$).

Depending on the implementation, the switch 445 and the resistor 446 may not be included in the electronic device 410.

Figure 5B:
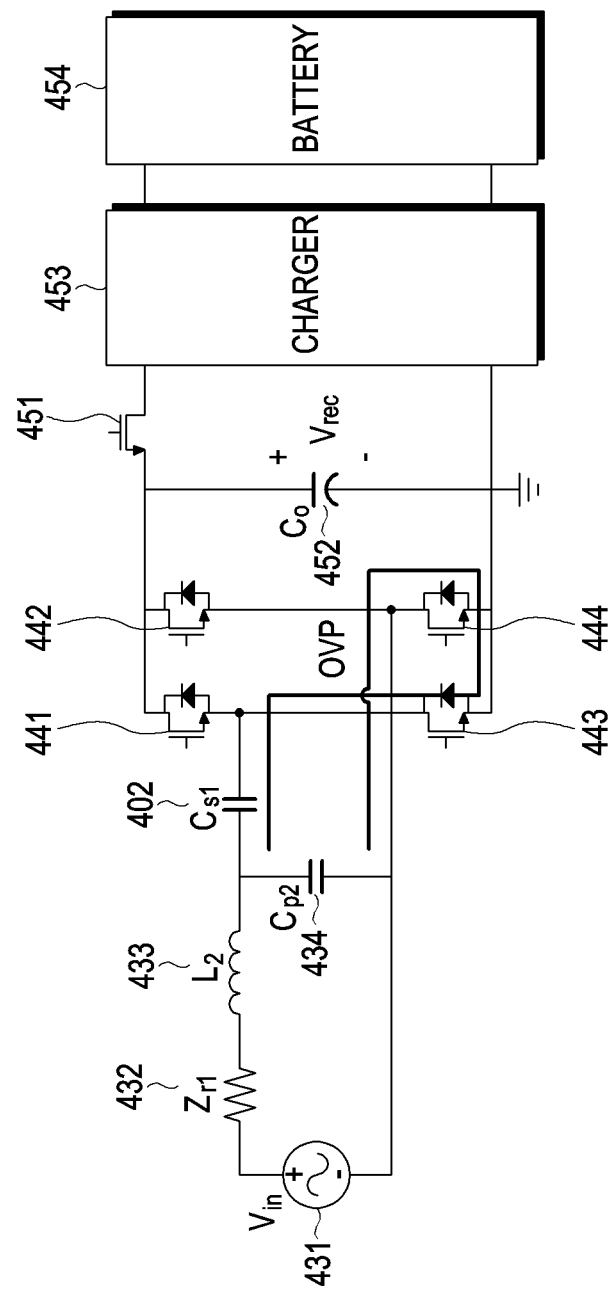
FIG. 5B is a diagram illustrating an example overvoltage protection operation according to an embodiment.

FIG. 5B is a diagram illustrating an example overvoltage protection operation according to an embodiment. According to an embodiment, as in FIG. 5A, an overvoltage protection operation may be an operation that diodes 443 and 444 are controlled to be in an on state and diodes 441 and 442 are controlled to be in an off state. While the diodes 443 and 444 are controlled to be in the on state and the diodes 441 and 442 are controlled to be in the off state, a current may not be provided to a charger 453, and an overvoltage may not be applied to a load such as the charger 453 and a battery 454. For example, if a voltage ($V_{RECT}$) at an output terminal of a rectifier is greater than or equal to a first threshold voltage, the diodes 443 and 444 may be controlled to be in the on state and the diodes 441 and 442 may be controlled to be in the off state. If the voltage ($V_{RECT}$) at the output terminal of the rectifier is less than or equal to a second threshold voltage, the bridge-diodes 441, 442, 443, and 444 may be operated for rectification. As described above, as shown in FIG. 3, the voltage ($V_{RECT}$) may decrease while the diodes 443 and 444 are controlled to be in the on state, and the diodes 441 and 442 are controlled to be in the off state, and the voltage ($V_{RECT}$) may increase while the bridge-diodes 441, 442, 443, and 444 operate for rectification.

According to an embodiment, the control circuit 117 may detect a rising edge of a turn-on signal for the switches (e.g., diodes 443 and 444) if the switches (e.g., diodes 443 and 444) are turned on at the same time. For example, the control circuit 117 may directly detect the rising edge, or detect an interrupt which is generated in response to the rising edge and received from an external device (e.g., an overvoltage protection circuit 116). The control circuit 117 may detect a falling edge of a turn-on signal for one of the switches (e.g., diodes 443 and 444) if the switches (e.g., diodes 443 and 444) are not turned on at the same time. For example, the control circuit 117 may directly detect the falling edge, or may detect an interrupt which is generated in response to the falling edge and received from the external device (e.g., the overvoltage protection circuit 116). Thereafter, by repetition having a hysteresis characteristic, the control circuit 117 may detect a rising edge of a turn-on signal in a case that the switches (e.g., diodes 443 and 444) are turned on at the same time. In this case, the control circuit 117 may identify difference between a time point when one of the switches (e.g., diodes 443 and 444) is turned off and a time point when the switches (e.g., diodes 443 and 444) are turned on at the same time again as a period ($t_{off}$) during which an overvoltage protection operation is stopped. The control circuit 117 may identify the period ($t_{off}$) during which the overvoltage protection operation is stopped based on a sampling result for a period between a first time point at which the switches (e.g., diodes 443 and 444) fail in being turned on at the same time after the switches (e.g., diodes 443 and 444) are turned on at the same time, and a second time point at which the switches (e.g., diodes 443 and 444) are turned on at the same time again. The control circuit 117 may identify a period increasing from a lower limit to an upper limit as the period ($t_{off}$) during which the overvoltage protection operation is stopped according to a sampling result for the voltage ($V_{RECT}$).

Figure 6:
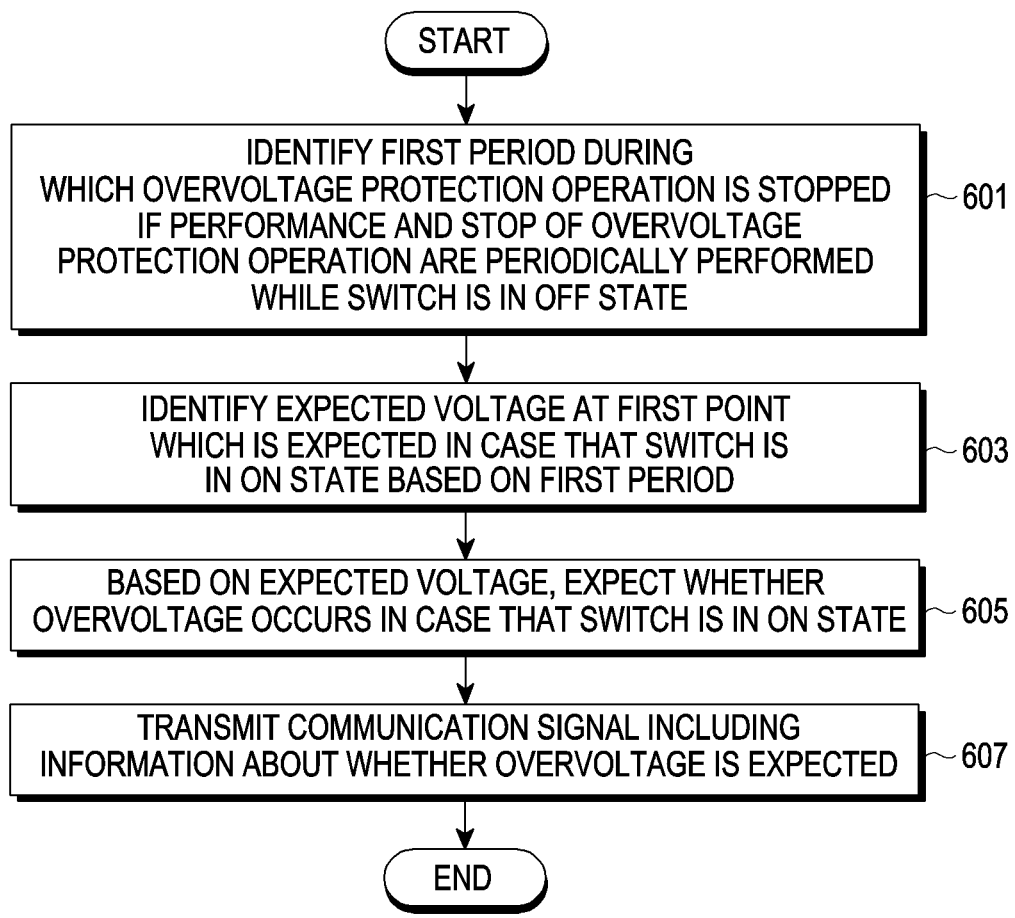
FIG. 6 is a flowchart illustrating an example method of operating an electronic device according to an embodiment.

FIG. 6 is a flowchart illustrating an example method of operating an electronic device according to an embodiment.

According to an embodiment, an electronic device 101 or 410 may identify a first period (e.g., $t_{off}$ in FIG. 3) during which an overvoltage protection operation is stopped if a performance of the overvoltage protection operation and a stop of the overvoltage protection operation are periodically performed while a switch (e.g., a switch 120) is in an off state in operation 601. As described above, a signal for overvoltage protection provided from an overvoltage protection circuit 116 may be identified in a control circuit 117. For example, the control circuit 117 may identify a time point at which the signal for the overvoltage protection is provided. The control circuit 117 may identify a time point at which the provision of the signal for the overvoltage protection is stopped or a time point at which a signal for stopping the overvoltage protection is provided. The control circuit 117 may measure the first period based on the identified time points. If the control circuit 117 provides the signal for the overvoltage protection, the control circuit 117 may identify a time point at which the signal for the overvoltage protection is output. The control circuit 117 may identify a time point at which output of the signal for the overvoltage protection is stopped or a time point at which a signal for stopping the overvoltage protection is output. The control circuit 117 may measure the first period based on the identified time points. As described above, there is no limitation to a scheme of measuring the first period during which the overvoltage protection operation is stopped.

In operation 603, the electronic device 101 (e.g., the control circuit 117) may identify an expected voltage at a first point (e.g., an output terminal of a rectifier) which is expected in a case that a switch is in an on state based on the first period. For example, the electronic device 101 may identify the expected voltage by inputting the measured first period to a stored equation. The electronic device 101 may store, for example, an equation which outputs the expected voltage as an output value with the first period as an input value, and this will be described later in more detail. The electronic device 101 may identify the expected voltage by referring to a measured first period in a pre-stored lookup table.

In operation 605, the electronic device 101 (e.g., the control circuit 117), based on the expected voltage, may expect whether an overvoltage occurs in a case that a switch (e.g., a switch 120) is in an on state. For example, the electronic device 101 may expect whether the overvoltage occurs based on whether the expected voltage is greater than or equal to a pre-designated threshold voltage. The threshold voltage may be a first threshold voltage.

In operation 607, the electronic device 101 may transmit a communication signal including information about whether the occurrence of the overvoltage is expected to a wireless power transmission device 1. For example, if the overvoltage is expected, the electronic device 101 may transmit information indicating that the overvoltage is expected to the wireless power transmission device 1. For example, if the overvoltage is not expected, the electronic device 101 may transmit information indicating that the overvoltage is not expected to the wireless power transmission device 1 or may not transmit a separate communication signal.

Figure 7A:
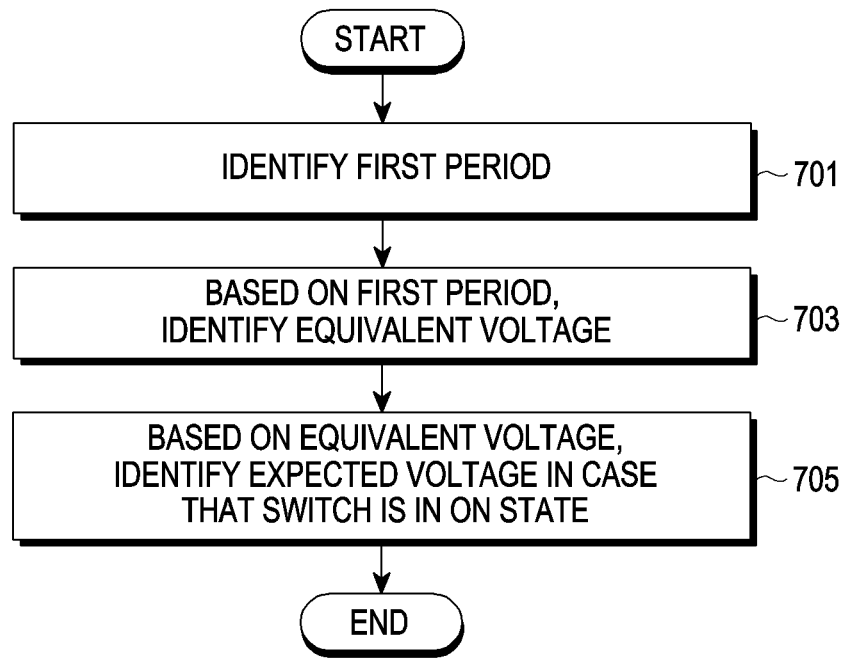
FIG. 7A is a flowchart illustrating an example method of operating an electronic device according to an embodiment.
Figure 8A:
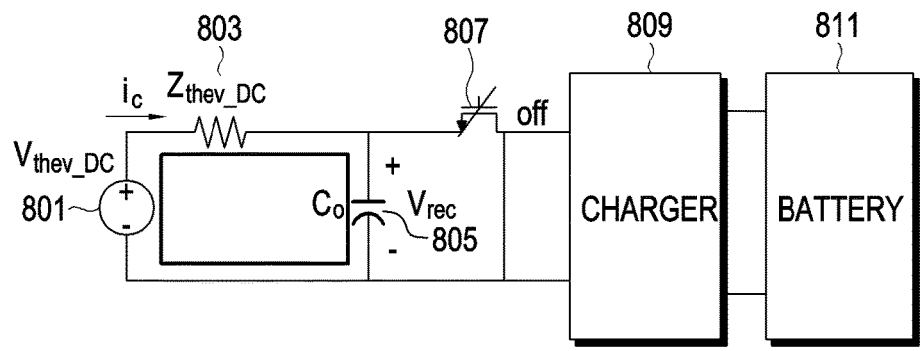
FIG. 8A is an equivalent circuit diagram according to an embodiment.
Figure 8B:
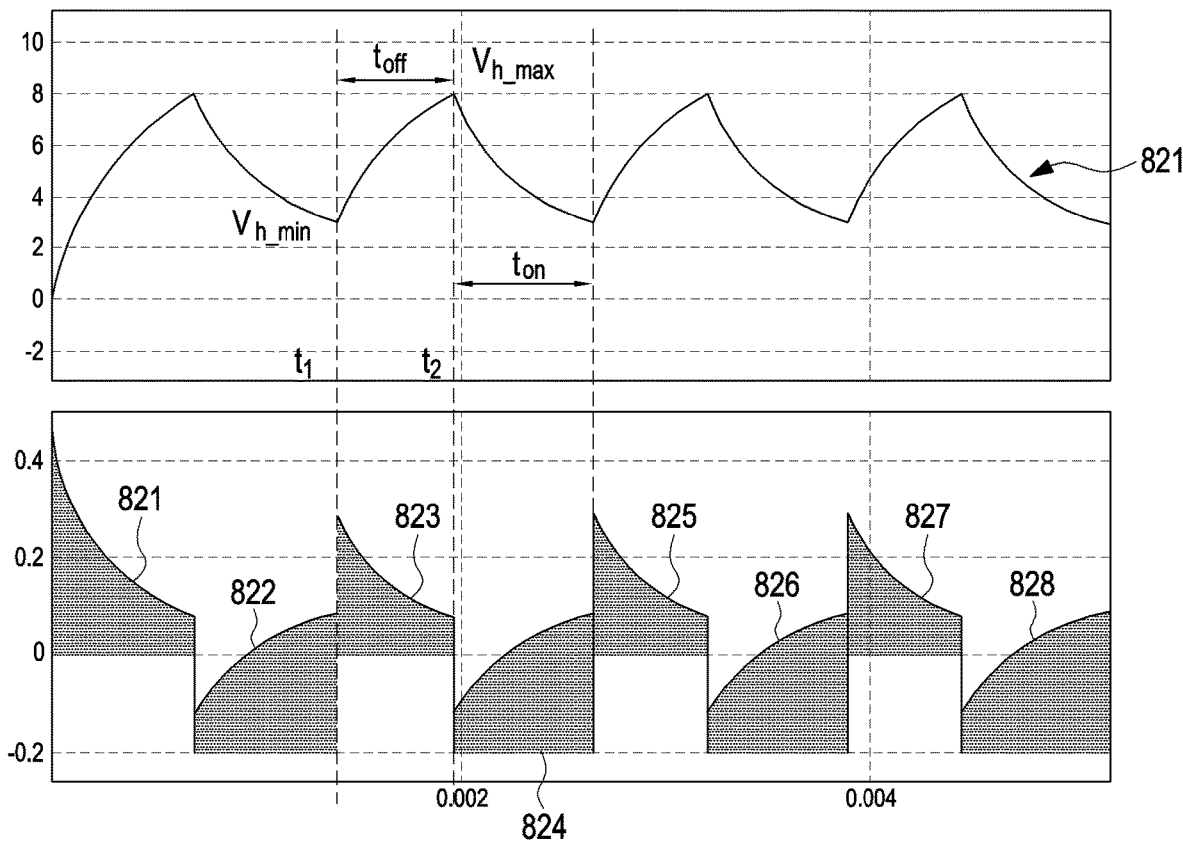
FIG. 8B is a diagram illustrating an example voltage and current in an operation having a hysteresis characteristic according to an embodiment.

FIG. 7A is a flowchart illustrating an example method of operating an electronic device according to an embodiment. FIG. 7A will be described with reference to FIGS. 8A and 8B. FIG. 8A is an equivalent circuit diagram of an electronic device according to an embodiment. FIG. 8B is a diagram illustrating an example voltage and current in an operation having a hysteresis characteristic.

According to an embodiment, an electronic device 101 or 410 (e.g., a control circuit 117) may identify a first period during which an overvoltage protection operation is stopped in operation 701. In operation 703, the electronic device (e.g., the control circuit 117) may identify an equivalent voltage based on the first period. For example, referring to FIG. 8A, an equivalent circuit may include a DC Thevenin power source 801, a DC Thevenin impedance 803, a capacitor 805, a switch 807, a charger 809, and a battery 8111. For example, if a rectifier is included in the Thevenin impedance 803, it may be interpreted as providing a DC power from the Thevenin impedance 803. In a Thevenin equivalent circuit, if the switch 807 is turned off in and the charger 809 and the battery 811 are not connected, an electric charge may be stored in the capacitor 805. For example, while the overvoltage protection operation is stopped, a current does not flow at a dummy resistor (e.g., a resistor 446), so the electric charge may be input to the capacitor 805. FIG. 8B shows a graph 821 of a voltage ($V_{RECT}$) and graphs 821, 822, 823, 824, 825, 826, 827, and 828 of a current ($I_{RECT}$) at an output terminal of a rectifier in a case that a performance of an overvoltage protection operation and a stop of the over voltage protection operation are repeated. As described in FIG. 3, the voltage ($V_{RECT}$) at the output terminal of the rectifier may increase during a period ($t_{off}$) during which the overvoltage protection operation is stopped. The voltage ($V_{RECT}$) at the output terminal may decrease during a period ($t_{or}$) during which the overvoltage protection operation is performed. A current at the capacitor 805 may have waveforms such as 823, 825, and 827 during the period ($t_{off}$) during which the overvoltage protection operation is stopped, and may have waveforms such as 822, 824, 826, and 828 during the period ($t_{on}$) during which the overvoltage protection operation is performed. It may be identified that currents 823, 825, and 827 while the overvoltage protection operation is stopped have relatively large values. In this case, a voltage ($V_{thev\_DC}$) of the power source 801 may be expressed as Equation 1.

$$V_{thev\_DC} = \frac{V_{h\_max} - V_{h\_min} e^{\frac{t_{off}}{\tau}}}{1 - e^{\frac{t_{off}}{\tau}}} \qquad \text{Equation 1}$$

$V_{h\_max}$ may be, for example, a first threshold voltage, which is a maximum value of a voltage ($V_{RECT}$) as in FIG. 8B. $V_{h\_min}$ may be, for example, a second threshold voltage, which is a minimum value of the voltage ($V_{RECT}$) as in FIG. 8B. For example, an equivalent voltage may be identified as shown in Equation 1 based on time ($t_{off}$) during which a capacitor is charged from a lower limit value ($V_{h\_min}$) to an upper limit value ($V_{h\_max}$). $\tau$ may be expressed as Equation 2.

$$\tau = C_o Z_{thev\_DC} \qquad \text{Equation 2}$$

In Equation 2, $C_0$ may be a capacitance of the capacitor 805 connected to the output terminal of the rectifier. $Z_{thev\_DC}$ may be expressed as Equation 3.

$$Z_{thev\_DC} = \frac{\pi^2}{8} \text{Re}\left\{Z_{cs2} + \frac{Z_2}{1 + Z_2 Z_{cp2}}\right\} \qquad \text{Equation 3}$$

$Z_{CS2}$ may be an impedance of a capacitor 413 in FIG. 4A, $Z_{cp2}$ may be an impedance of a capacitor 414, $Z_2$ may be a sum of an impedance ($Z_{L2}$) of a coil 411 and a resistance value ($R_2$) of a resistor 412, and all of $Z_{CS2}$, $Z_{cp2}$, and $Z_2$ may be constants.

The equivalent voltage may be obtained by Equation 1, but to improve an operation speed, the equivalent voltage may be obtained using an equation approximating Equation 1. Equation 4 represents an approximation process for Equation 1.

$$V_{thev\_DC} \approx \frac{\tau(V_{h\_max} - V_{h\_min})}{t_{off}} + \frac{V_{h\_max} + V_{h\_min}}{2} \qquad \text{Equation 4}$$

The electronic device 101 may identify the equivalent voltage ($V_{thev\_DC}$) according to Equation 1 or Equation 4. For example, $$\int_{t_2}^{t_1} V_{thev\_DC} dt = Z_{thev\_DC} \int_{t_2}^{t_1} i_c dt + \int_{t_2}^{t_1} V_{RECT} dt, \text{ and}$$

$$I_c = \frac{\int_{t_2}^{t_1} i_c dt}{t_{off}} = \frac{C_o(V_{h\_max} - V_{h\_min})}{t_{off}},$$

so Equation 4 may be derived. Here, $t_1$ and $t_2$ are a time point at which the overvoltage protection operation is stopped and a time point at which the overvoltage protection operation is resumed, and $t_2 - t_1$ may be $t_{off}$. Meanwhile, if the voltage ($V_{RECT}$) is not out of an allowable range, the voltage ($V_{RECT}$) may be the same as the equivalent voltage ($V_{thev\_DC}$).

In operation 705, the electronic device 101 may identify an expected voltage in a case that a switch is in an on state based on the equivalent voltage. For example, the electronic device 101 may identify the expected voltage based on Equation 5.

$$V_{RECT} = \frac{V_{thev\_DC}}{2}\left(1 \pm \sqrt{1 - P_{load}/P_{max}}\right) \approx \qquad \text{Equation 5}$$

$$\frac{V_{thev\_DC}}{2}\left\{1 \pm \left(1 - \frac{1}{2}\frac{P_{load}}{P_{max}} - \frac{1}{8}\left(\frac{P_{load}}{P_{max}}\right)^2 - \cdots\right)\right\}$$

In Equation 5, $P_{load}$ may be a power consumed at a load, and $P_{max}$ may be a power which the electronic device may receive at its maximum. Due to a loose magnetic coupling between the wireless power transmission device 1 and electronic device 101 and impedance matching, $P_{max}$ may not be changed according to a position of the electronic device 101 and/or a condition of the wireless power transmission device 1, and may be expressed as, for example, Equation 6.

$$P_{max} = \frac{V_{thev\_DC}}{4Z_{thev\_DC}} \qquad \text{Equation 6}$$

The electronic device 101 may identify or calculate the power ($P_{load}$) consumed at the load. In an example, the electronic device 101 may identify the power ($P_{load}$) based on a product of a battery voltage ($V_{bat}$) and a battery current ($I_{CC}$), and the battery current ($I_{CC}$) may be referred to as a constant current. For example, the electronic device 101 may obtain the battery voltage ($V_{bat}$) from a battery gauge. The battery gauge may monitor (or measure) a battery state. The battery current ($I_{CC}$) may be a value set at a charger 114. In another example, the electronic device 101 may identify a sum of the battery power ($P_{bat}$) and a power of at least one other hardware (e.g., a power (Pic) of a reception IC, and a power ($P_{MCU}$) of a control circuit) as the power ($P_{load}$). The battery power ($P_{bat}$), as described above, may be identified based on the product of the battery voltage ($Vb_{at}$) and the battery current ($I_{CC}$), and the power of the at least one other hardware (e.g., the power (Pic) of the reception IC, and the power ($P_{MCU}$) of the control circuit) may be identified in advance as a rated power value. In another example, the electronic device 101 may identify a previously stored value as the power ($P_{load}$). For example, the electronic device 101 may perform charging before a no-load state, and identify the power ($P_{load}$) in a charging process. The electronic device 101 may store information about the power ($P_{load}$) identified in the charging process. A state of the battery does not change rapidly, so the power ($P_{load}$) identified in the charging process may be used as a power ($P_{load}$) in a no-load state. A scheme of identifying the power ($P_{load}$) during the charging process will be described in greater detail below with reference to FIG. 15. In another example, the electronic device 101 may identify a default value as the power ($P_{load}$).

Based on Equation 5, the electronic device 101 may expect a voltage ($V_{RECT}$) at an output terminal of a rectifier in a case that a load is connected. According to an embodiment, the electronic device 101 stores an equation which is based on Equations 5 and 6, and inputs an identified period ($t_{off}$) during which an overvoltage protection operation is stopped to the equation to expect the voltage ($V_{RECT}$) at the output terminal of the rectifier. For example, if the power ($P_{load}$) is the default value, in Equation 6, the period ($t_{off}$) during which the overvoltage protection operation is stopped may be a variable. The electronic device 101 may identify whether an occurrence of an over voltage is expected based on whether an expected voltage is greater than or equal to a threshold voltage (e.g., a first threshold voltage). The electronic device 101 may store an algorithm which outputs whether the overvoltage occurs as an output value with the period ($t_{off}$) during which the overvoltage protection operation is stopped as an input value. In this case, the electronic device 101 may input the period ($t_{off}$) during which the overvoltage protection operation is stopped to the algorithm to directly identify whether the overvoltage occurs. That is, prediction of the voltage ($V_{RECT}$) at the output terminal of the rectifier may be omitted.

Figure 7B:
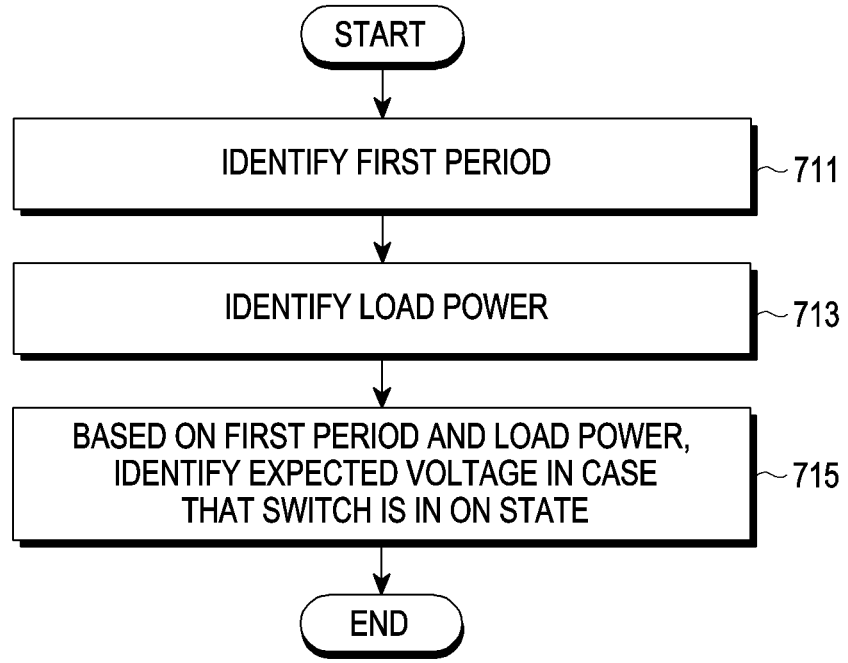
FIG. 7B is a flowchart illustrating an example method of operating an electronic device according to an embodiment.

FIG. 7B is a flowchart illustrating an example method of operating an electronic device according to an embodiment.

According to an embodiment, in operation 711, an electronic device 101 may identify a first period (e.g., $t_{off}$) during which an overvoltage protection operation is stopped. In operation 713, the electronic device 101 may identify a load power ($V_{RECT}$). As described above, the electronic device 101 may identify a power ($P_{load}$) as a product of an average voltage and an average current at a load, or may identify the power ($P_{load}$) based on a product of a battery voltage ($V_{bat}$) and a battery current ($I_{CC}$), or may identify the power load ($P_{load}$) based on a sum of a battery power and a power of a circuit for receiving a wireless power, and other hardware (e.g., a control circuit 177).

In operation 715, the electronic device 101 may identify an expected voltage in a case that a switch is in an on state based on the first period and the load power. As described above, in Equation 6, a period ($t_{off}$) during which an overvoltage protection operation is stopped and a load power ($P_{load}$) may be also variables. For example, the electronic device 101 may store, for example, an equation which outputs an expected voltage ($V_{RECT}$) with the period ($t_{off}$) during which the overvoltage protection operation is stopped and the load power ($P_{load}$) as input values, such as Equation 5. The electronic device 101 may identify the expected voltage ($V_{RECT}$) by inputting the period ($t_{off}$) during which the overvoltage protection operation is stopped and the load power ($P_{load}$) to the stored equation, and expect whether the overvoltage occurs based on whether the expected voltage ($V_{RECT}$) is greater than or equal to a threshold voltage (e.g., a first threshold voltage).

The electronic device 101 may store an algorithm which outputs whether the overvoltage occurs as an output value with the period ($t_{off}$) during which the overvoltage protection operation is stopped and the load power ($P_{load}$) as input values. In this case, the electronic device 101 may input the period ($t_{off}$) during which the overvoltage protection operation is stopped and the load power ($P_{load}$) to the algorithm to directly identify whether the overvoltage occurs. For example, prediction of the voltage ($V_{RECT}$) at the output terminal of the rectifier may be omitted.

Figure 9:
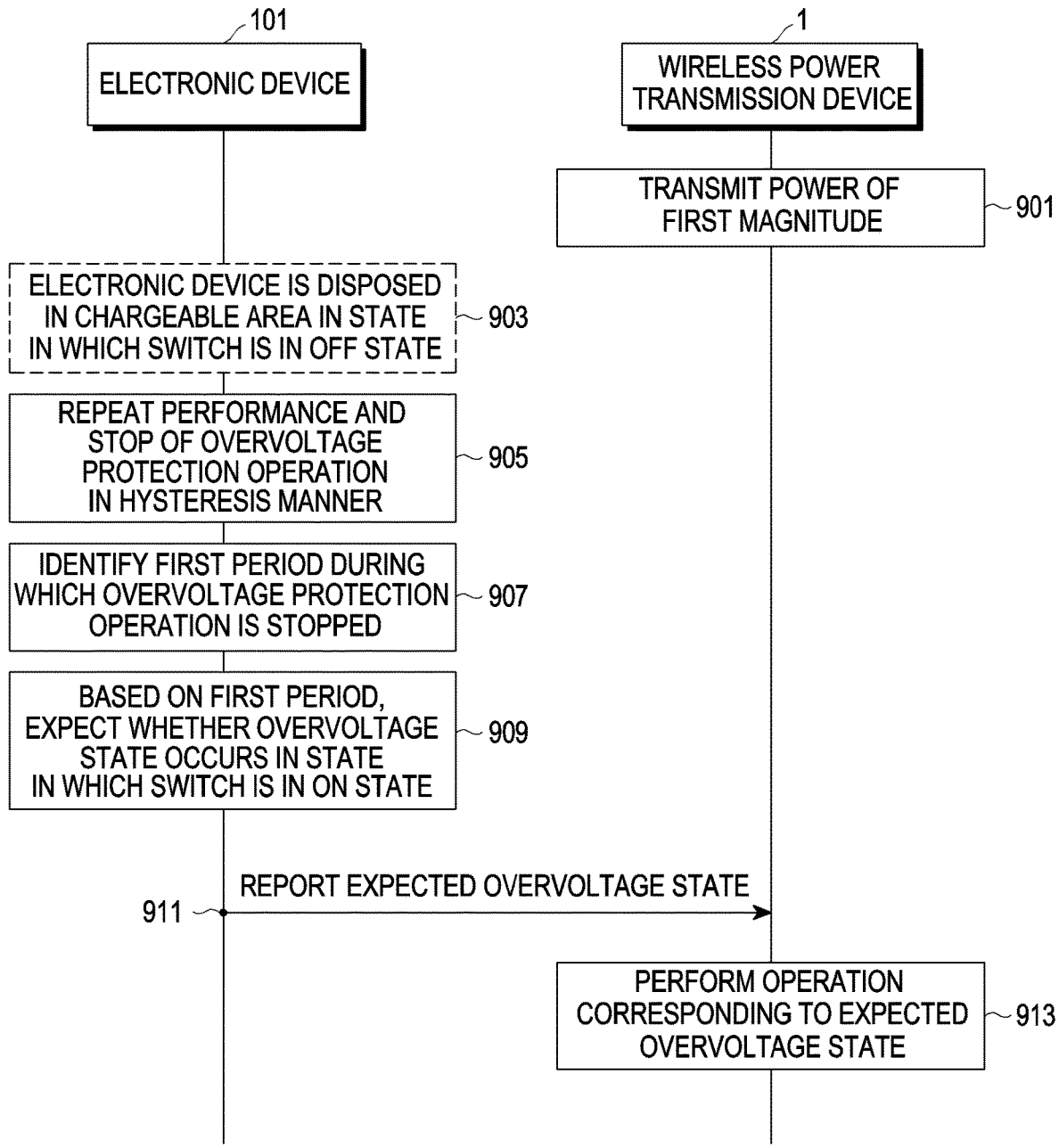
FIG. 9 is a signal flow diagram illustrating an example method of operating an electronic device according to an embodiment.

FIG. 9 is a signal flow diagram illustrating an example method of operating an electronic device according to an embodiment. In this disclosure, a fact that the electronic device performs a specific operation may refer, for example, to a control circuit 117 performing the specific operation or controlling other hardware to perform the specific operation. The fact that the electronic device performs the specific operation may refer, for example, to an instruction causing the control circuit 117 (or other hardware) to perform the specific operation being executed or stored in the electronic device.

According to an embodiment, a wireless power transmission device 1 may transmit a power of a first magnitude in operation 901. In operation 903, an electronic device 101 may be disposed in a chargeable area in a state in which a switch (e.g., a switch 120) is in an off state. A user places the electronic device 101 in the chargeable area, so operation 903 may be illustrated with a dotted line. In operation 905, the electronic device 101 may repeat a performance and a stop of an overvoltage protection operation in a hysteresis manner. For example, the electronic device 101 may start performing the overvoltage protection operation if a voltage (e.g., $V_{RECT}$) at a first point in a circuit of the electronic device 101 is greater than or equal to a first threshold voltage, and stop performing the overvoltage protection operation if the voltage (e.g., $V_{RECT}$) is less than or equal to a second threshold voltage.

In operation 907, the electronic device 101 may identify a first period ($t_{off}$) during which the overvoltage protection operation is stopped. In operation 909, the electronic device 101 may expect whether an overvoltage state occurs in a state in which the switch is in an on state, based on the first period. As described above, the electronic device 101 may measure the first period to expect whether the overvoltage state occurs, or further measures an additional factor (e.g., a load power ($P_{load}$) etc.) as well as the first period to expect whether the overvoltage state occurs. In operation 911, the electronic device 101 may report the expected overvoltage state to the wireless power transmission device 1. For example, if the overvoltage state is expected, the electronic device 101 may transmit a communication signal indicating the overvoltage state or indicating that the overvoltage state is expected to the wireless power transmission device 1. For example, the electronic device 101 may transmit a communication signal in which an OVP indication in an existing standard is set to true to the wireless power transmission device 1. The wireless power transmission device 1 and the electronic device 101 may manage an OVP expected indication separately from the OVP indication. In this case, the electronic device 101 may transmit a communication signal in which the OVP expected indication is set to true to the wireless power transmission device 1.

If the overvoltage state is not expected, the electronic device 101 may transmit a communication signal indicating that the overvoltage state does not occur or indicating that the overvoltage state is not expected to the wireless power transmission device 1. If the overvoltage state is not expected, the electronic device 101 may omit an overvoltage-related report.

In another example, the electronic device 101 may transmit the expected voltage ($V_{RECT}$) to the wireless power transmission device 1 without identifying whether the overvoltage state is expected. For example, if the electronic device 101 adopts an AFA standard, the electronic device 101 may include a magnitude of the expected voltage, not a currently measured voltage into a "$V_{RECT}$" field in a PRU dynamic signal and transmit the PRU dynamic signal to the wireless power transmission device 1. A new field such as "$V_{RECT\_EXPECT}$" may be added to the PRU dynamic signal. In this case, the electronic device 101 may include the magnitude of the expected voltage into the new field in the PRU dynamic signal and transmit the PRU dynamic signal to the wireless power transmission device 1. The wireless power transmission device 1 may increase or decrease a magnitude of a transmission power based on a value within the field in the received signal. The wireless power transmission device 1 may be configured to increase the magnitude of the transmission power if the magnitude of the expected voltage is less than a designated magnitude.

For example, the wireless power transmission device 1 may transmit, to the electronic device 101, a communication signal indicating that a magnitude of a power may not be reduced if it reaches a lower limit of the power while the wireless power transmission device 1 decreases the magnitude of the power. Upon receiving the communication signal, the electronic device 101 may output a message indicating that it is required to be far from the wireless power transmission device 1.

In operation 913, the wireless power transmission device 1 may perform an operation corresponding to the expected overvoltage state. For example, if it is identified that the overvoltage is expected, the wireless power transmission device 1 may decrease the magnitude of the transmission power, or may command the electronic device 1 to wait for charging. For example, the wireless power transmission device 1 may not transmit a command signal indicating a charge start to the electronic device 1. For example, the wireless power transmission device 1 may enter an error state (e.g., a latch fault state or a local fault state in the AFA standard) if the overvoltage state is expected, and there is no limitation to an operation corresponding to the overvoltage state. For example, the wireless power transmission device 1 may start charging based on a fact that the overvoltage is not expected and at least one procedure for charging required in the standard is completed. The start of charging may include, for example, application of a power for charging and/or transmission of a control signal indicating a charging start, but there is no limitation thereto.

Figure 10:
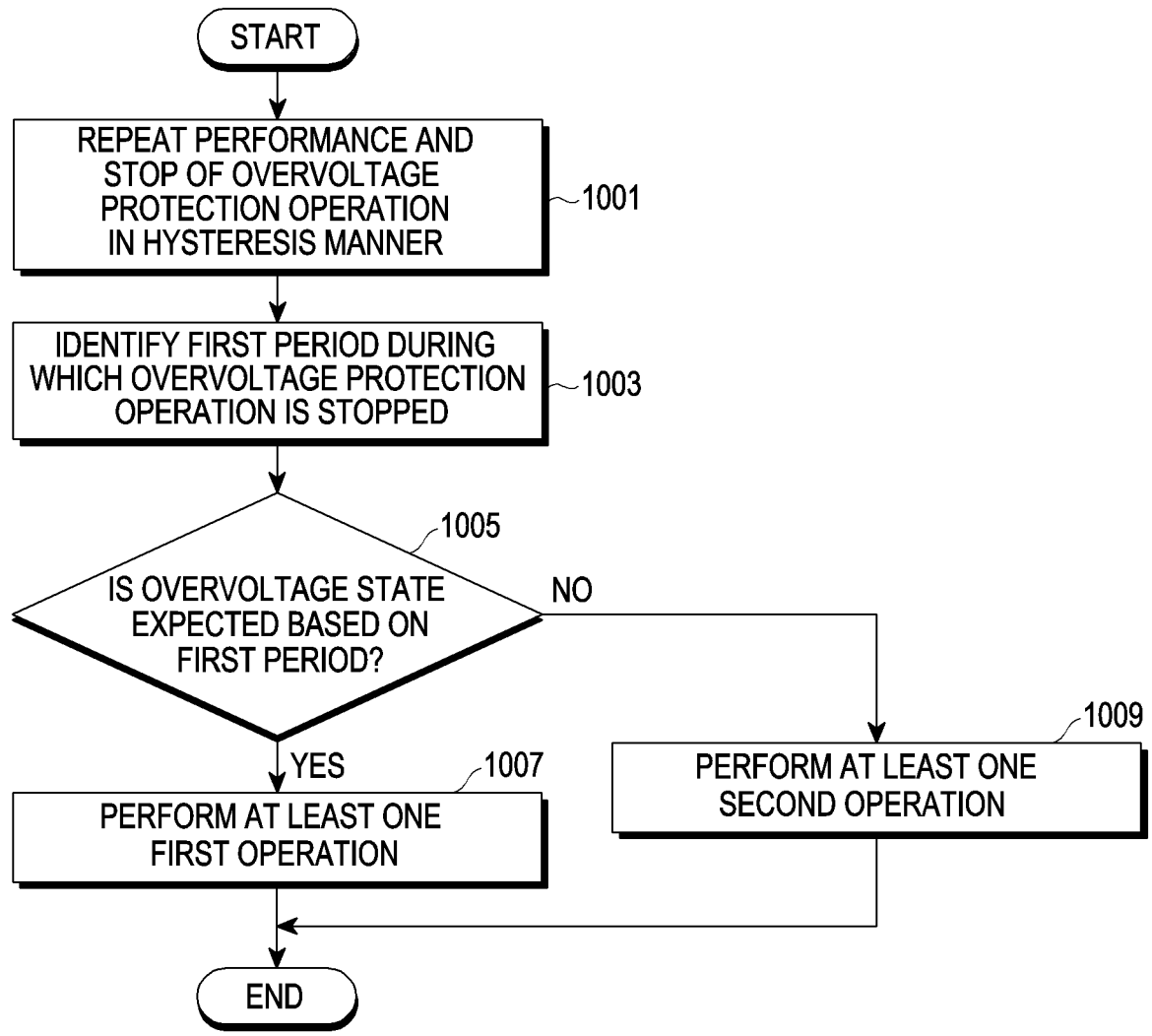
FIG. 10 is a flowchart illustrating an example method of operating an electronic device according to an embodiment.

FIG. 10 is a flowchart illustrating an example method of operating an electronic device according to an embodiment.

According to an embodiment, an electronic device 101 may repeat a performance and a stop of an overvoltage protection operation in a hysteresis manner in operation 1001. In operation 1003, the electronic device 101 may identify a first period ($t_{off}$) during which the overvoltage protection operation is stopped. In operation 1005, the electronic device 101 may identify whether an overvoltage state is expected based on the first period.

Figure 11:
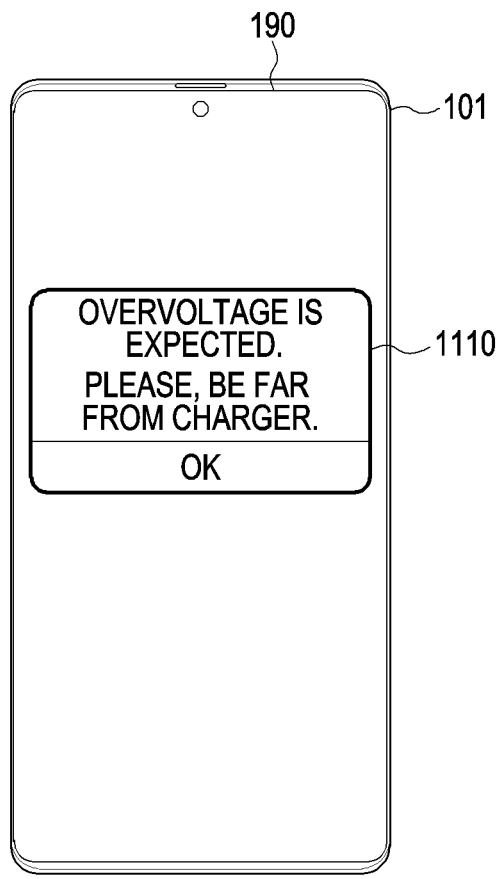
FIG. 11 is a diagram illustrating an example screen displayed on an electronic device according to an embodiment.

If the overvoltage state is expected ("Yes" in operation 1005), the electronic device 101 may perform at least one first operation in operation 1007. For example, the electronic device 101 may transmit, to a wireless power transmission device 1, a communication signal indicating the overvoltage state or a communication signal indicating that the overvoltage state is expected. The electronic device 101 may output, for example, a message indicating an occurrence of the overvoltage or indicating that the occurrence of the overvoltage is expected. For example, the electronic device 101 may display a pop-up window 1110 including a text indicating that the overvoltage is expected on a display 190 as shown in FIG. 11, but FIG. 11 is merely an example, and there is no limitation to a format of the message and/or content included in the message. The electronic device 101 may not perform (or delay) a start of charging. For example, if a control signal indicating a charging start is received from the wireless power transmission device 1, the electronic device 101 may be configured to control a switch (e.g., a switch 120) to be in an on state to provide a battery with a power. However, in a case that the overvoltage state is expected, even though the control signal indicating the charging start is received, the electronic device 101 may ignore the control signal or delay the start of charging. For example, the electronic device 101 may start charging after waiting until a state in which the overvoltage state is not expected. The electronic device 101 may transmit, to the wireless power transmission device 1, a communication signal requesting a decrease in a magnitude of a power.

If the overvoltage state is not expected ("No" in operation 1005), the electronic device 101 may perform at least one second operation in operation 1009. For example, the electronic device 101 may transmit, to the wireless power transmission device 1, a communication signal indicating that the overvoltage state does not occur, or a communication signal indicating that the overvoltage state is not expected. The electronic device 101 may be configured not to transmit a communication signal related to an overvoltage. The electronic device 101 may output, for example, a message indicating that an occurrence of the overvoltage is not expected. The electronic device 101 may start charging based on a fact that a charging start condition is satisfied. For example, if a control signal indicating a charging start is received from the wireless power transmission device 1, the electronic device 101 may control a switch (e.g., a switch 120) to be in an on state to provide a battery with a power.

Although not shown in FIG. 10, the electronic device 101 may identify that an expected voltage ($V_{RECT}$) is less than a threshold lower limit voltage. In this case, the electronic device 101 may output a message requesting to move to be close to the wireless power transmission device 1. The electronic device 101 may transmit a communication signal requesting an increase in a magnitude of a power to the wireless power transmission device 1.

Figure 12:
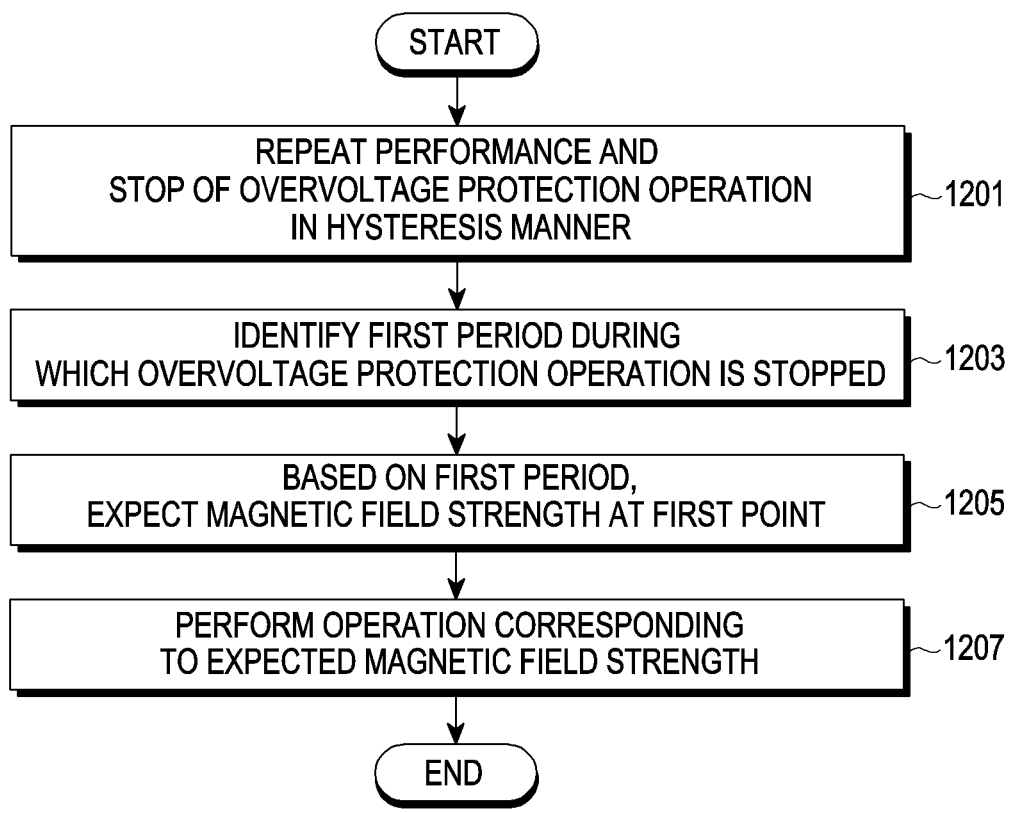
FIG. 12 is a flowchart illustrating an example method of operating an electronic device according to an embodiment.
Figure 13A:
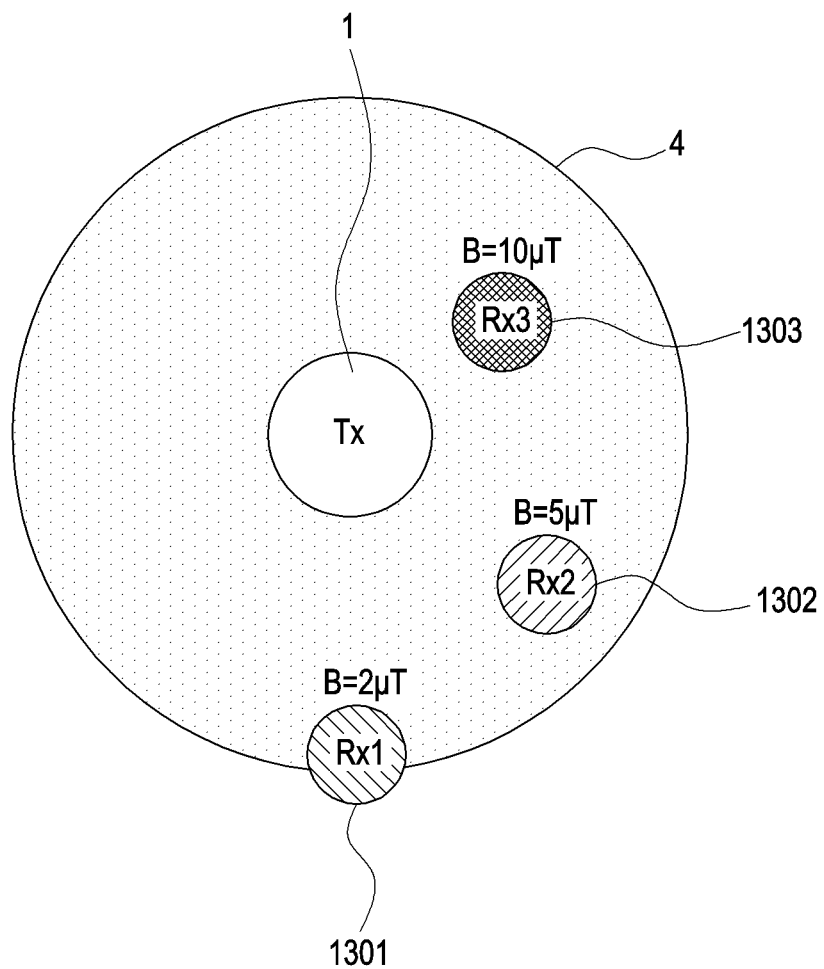
FIG. 13A is a diagram illustrating an example scheme indicating strength of a magnetic field according to various embodiments.
Figure 13B:
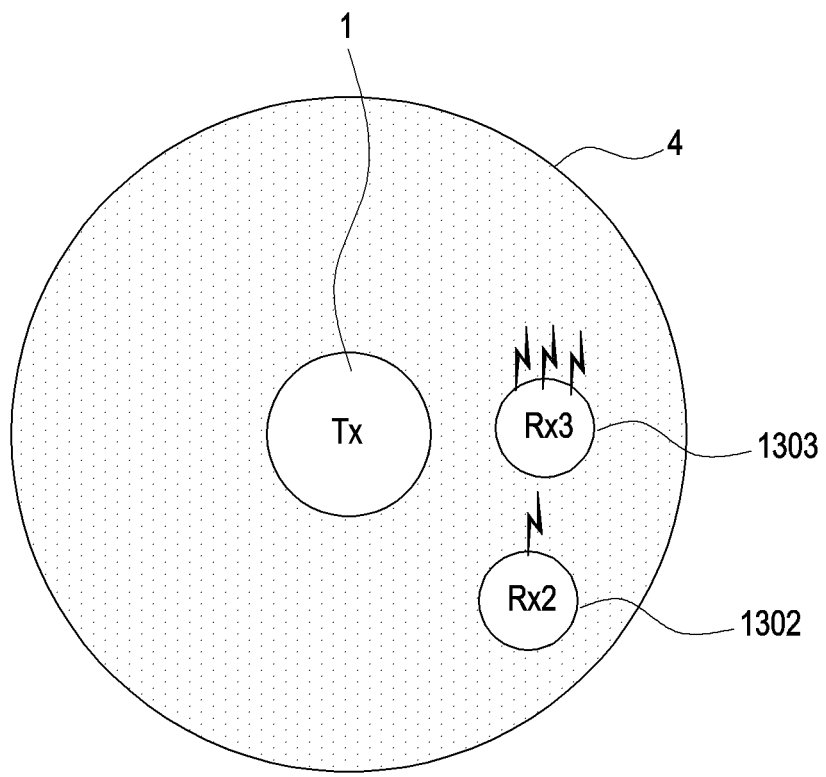
FIG. 13B is a diagram illustrating an example scheme indicating strength of a magnetic field according to various embodiments.
Figure 13C:
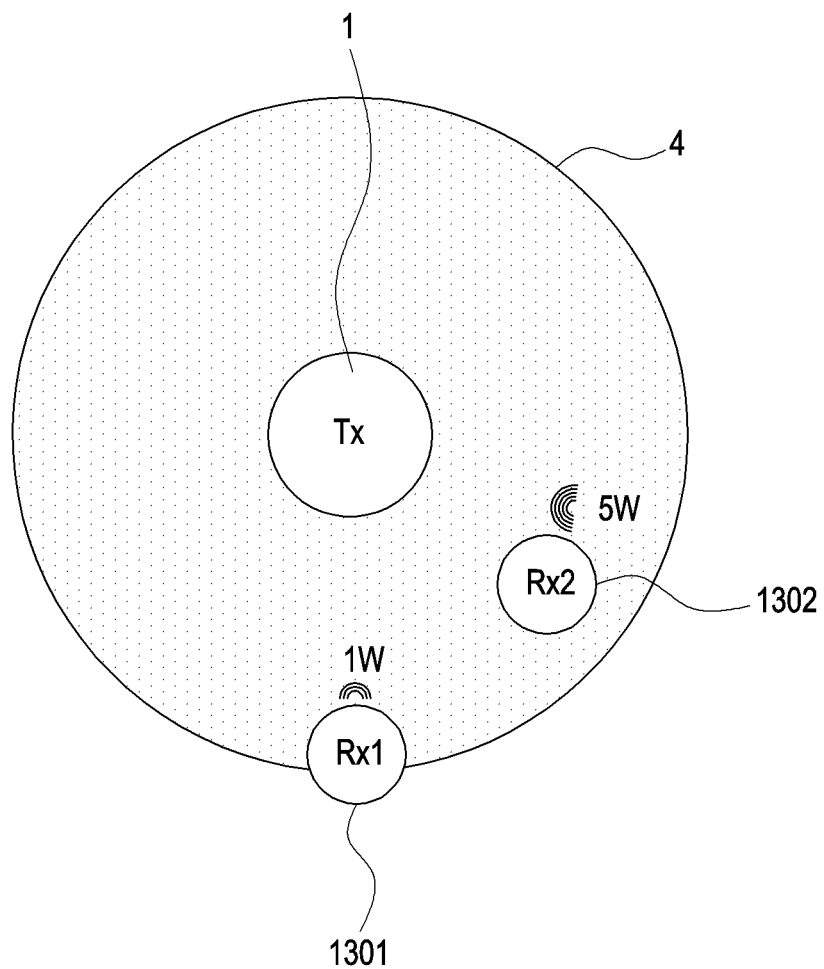
FIG. 13C is a diagram illustrating an example scheme indicating strength of a magnetic field according to various embodiments.

FIG. 12 is a flowchart illustrating an example method of operating an electronic device according to an embodiment. An embodiment in FIG. 12 will be described in greater detail below with reference to FIGS. 13A, 13B and 13C (which may be referred to hereinafter as FIGS. 13A to 13C for convenience). FIGS. 13A to 13C are diagrams for illustrating example schemes indicating strength of a magnetic field according to various embodiments.

According to an embodiment, in operation 1201, the electronic device 101 may repeat a performance and a stop of an overvoltage protection operation in a hysteresis manner. For example, the electronic device 101 start performing the overvoltage protection operation if a voltage (e.g., $V_{RECT}$) at a first point in a circuit of the electronic device 101 is greater than or equal to a first threshold voltage, and stop performing the overvoltage protection operation if the voltage (e.g., $V_{RECT}$) is less than or equal to a second threshold voltage. In operation 1203, the electronic device 101 may identify a first period ($t_{off}$) during which the overvoltage protection operation is stopped. In operation 1205, the electronic device 101 may expect strength of a magnetic field at the first point based on the first period. Equation 7 may express strength of a magnetic field, formed by a magnetic field generated by the wireless power transmission device 1, at a position of a coil for receiving a power in the electronic device 101.

$$B = \frac{V_{ind}}{\omega_s N_2 A_2} \qquad \text{Equation 7}$$

In Equation 7, $V_{ind}$ may be an induced voltage at a coil, $\omega_s$ may be an angular frequency of an AC power, N may be the number of winding wires of the coil, and A may be an area of the coil. The induced voltage ($V_{ind}$) at the coil may be expressed as Equation 8.

$$V_{ind} = \frac{\sqrt{2}}{\pi}\left(1 + \frac{Z_2}{Z_{cp2}}\right)(V_{thev\_DC} + 2V_d) \qquad \text{Equation 8}$$

In Equation 8, $Z_2$ may be a sum of an impedance $Z_{L2}$ of a coil 411 and a resistance value $R_2$ of a resistor 412, and $Z_{cp2}$ may be an impedance of a capacitor 414, and $V_d$ may be a voltage drop of a rectifier. In Equation 8, $V_{thev\_DC}$ may be expressed as in Equation 3 or Equation 4. As in Equation 4, $V_{thev\_DC}$ may be identified by a first period (e.g., $t_{off}$) during which the overvoltage protection operation is stopped.

In operation 1207, the electronic device 101 may perform an operation corresponding to expected magnetic field strength. For example, the electronic device 101 may transmit information about the magnetic field strength to the wireless power transmission device 1. The electronic device 101 may output information about the magnetic field strength. For example, as shown in FIG. 13A, each of electronic devices 1301, 1302, and 1303 may display a text (e.g., 2 µT, 5 µT, and 10 µT) for strength of a currently identified magnetic field. As shown in FIG. 13B, each of the electronic devices 1302 and 1303 may output a vibration corresponding to the strength of the currently identified magnetic field. If relatively strong magnetic field strength is identified, the electronic device may output a vibration of relatively strong strength, and accordingly, a user may recognize that a magnetic field having strong strength is formed at a current position. The electronic devices 1301 and 1302 may provide information in a power unit [W], as shown in FIG. 13C. Because user may not be familiar with a magnetic field unit [T], the information whose unit is converted from the magnetic field unit [T] to the power unit [W] may be provided.

The electronic device 101 may identify a safety grade based on the expected magnetic field. For example, the electronic device 101 identify a safety grade (e.g., a safety grade for a human body) at a current position based on a comparison result between a value which is set based on a magnetic field regulation and the expected magnetic field, and provide the identified result. The electronic device 101 may identify a charging stability based on the expected magnetic field, and may provide the identified result. According to an embodiment, the electronic device 101 may predict a magnetic field along with whether an overvoltage is expected as described above, or may predict the magnetic field alone.

The longer a target power transmission distance is, the higher a magnetic field density may be at a position around the wireless power transmission device 1, and accordingly, attention may be required regarding a receiver specification and a user body safety. As described above, as an operation corresponding to the magnetic field is performed, a safety of the electronic device 101 and the user may be guaranteed.

Figure 14:
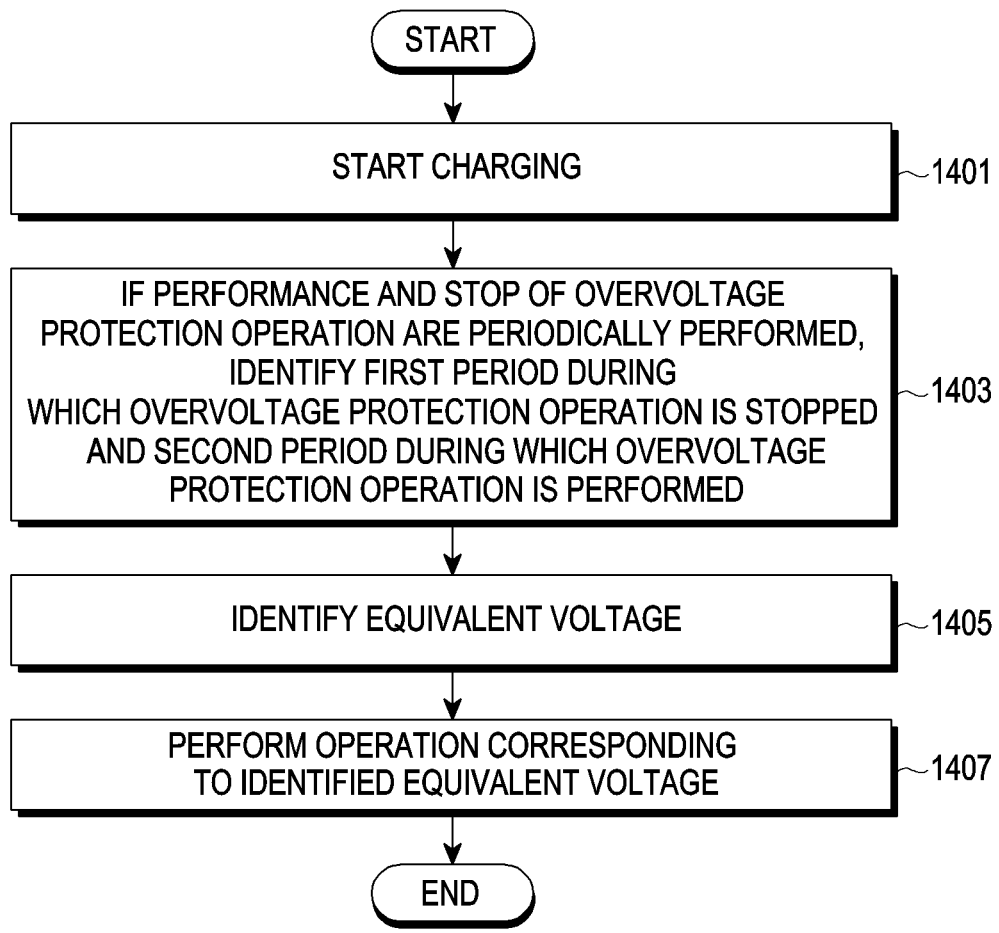
FIG. 14 is a flowchart illustrating an example method of operating an electronic device according to various embodiments.

FIG. 14 is a flowchart illustrating an example method of operating an electronic device according to an embodiment.

According to an embodiment, an electronic device 101 may start charging in operation 1401. For example, the electronic device 101 may control a switch 120 to be in an on state, so a power which is received and processed via a resonance circuit 111 may be provided to a charger 114. The charger 114 may charge a battery 115 by adjusting a voltage and/or a current of the received power.

In operation 1403, if a performance and a stop of an overvoltage protection operation are periodically performed, the electronic device 101 may identify a first period during which the overvoltage protection operation is stopped (e.g., $t_{off}$ in FIG. 3) and a second period during which the overvoltage protection operation is performed (e.g., $t_{on}$ in FIG. 3). A scheme of identifying the second period may be substantially similar to a scheme of identifying the first period. During charging, the overvoltage protection operation may be performed based on a voltage at an output terminal of a rectifier 112. For example, if the voltage ($V_{RECT}$) at the output terminal of the rectifier 112 is greater than or equal to a first threshold voltage, the overvoltage protection operation may be performed, and if the voltage ($V_{RECT}$) is less than or equal to a second threshold voltage, the overvoltage protection operation may be stopped. Accordingly, for example, as shown in FIG. 3, a decrease in the voltage ($V_{RECT}$) from the first threshold voltage to the second threshold voltage and an increase in the voltage ($V_{RECT}$) from the second threshold voltage to the first threshold voltage may be repeated.

In operation 1405, the electronic device 101 may identify an equivalent voltage. For example, the electronic device 101 may identify an equivalent voltage ($V_{thev\_DC}$) based on Equation 9.

$$V_{thev\_DC} \approx \tau(V_{h\_max} - V_{h\_min})\left(\frac{1}{t_{off}} + \frac{1}{t_{on}}\right) + \frac{V_{h\_max} + V_{h\_min}}{2} \qquad \text{Equation 9}$$

In operation 1407, the electronic device 101 may perform an operation corresponding to the identified equivalent voltage ($V_{thev\_DC}$).

For example, if the equivalent voltage ($V_{thev\_DC}$) is greater than a first threshold equivalent voltage ($V_{th\_high}$), the electronic device 101 may transmit a communication signal requesting a decrease in a magnitude of a transmission power to the wireless power transmission device 1. If the equivalent voltage ($V_{thev\_DC}$) is greater than the first threshold equivalent voltage ($V_{th\_high}$), the electronic device 101 may output a message indicating that it is required to be far from the wireless power transmission device 1. For example, if the equivalent voltage ($V_{thev\_DC}$) is less than a second threshold equivalent voltage ($V_{th\_low}$), the electronic device 101 may transmit a communication signal requesting an increase in the magnitude of the transmission power to the wireless power transmission device 1. If the equivalent voltage ($V_{thev\_DC}$) is less than the second threshold equivalent voltage ($V_{th\_low}$), the electronic device 101 may output a message indicating that it is required to be close to the wireless power transmission device 1. For example, the electronic device 101 may be configured to enable a charger 114 if the equivalent voltage ($V_{thev\_DC}$) is in a range from the first threshold equivalent voltage ($V_{th\_high}$) to the second threshold equivalent voltage ($V_{th\_low}$). According to the above, an overvoltage being applied to the rectifier may be avoided and/or prevented.

In another embodiment, the electronic device 101 may further identify strength of a magnetic field even during charging. As described with reference to Equations 7 and 8, if the equivalent voltage ($V_{thev\_DC}$) is identified, the strength of the magnetic field may also be identified. The electronic device 101 may identify the strength of the magnetic field and perform an operation corresponding to the strength of the magnetic field. The operation corresponding to the strength of the magnetic field has been described in FIG. 12, a description of the corresponding operation will not be repeated here.

Figure 15:
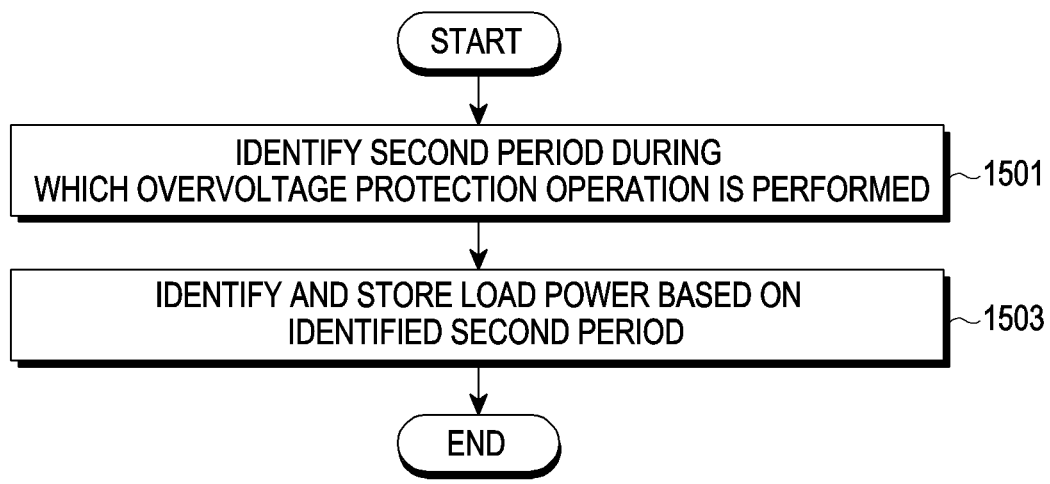
FIG. 15 is a flowchart illustrating an example method of operating an electronic device according to various embodiments.

FIG. 15 is a flowchart illustrating an example method of operating an electronic device according to an embodiment.

According to an embodiment, in operation 1501, an electronic device 101 may identify a second period during which an overvoltage protection operation is performed. For example, even after starting charging, the electronic device 101 may repeat a performance and a stop of the overvoltage protection operation having a hysteresis characteristic, as described in FIG. 14. In operation 1503, the electronic device 101 may identify and store a load power ($P_{load}$) based on the identified second period. The electronic device 101 may first identify a current input to a load, for example, a load current ($I_{load}$), which is a current flowing through a switch 120. The load current ($I_{load}$) may be expressed as, for example, Equation 10.

$$I_{load} = \frac{\int_{t_2}^{t_1} i_c dt}{t_{on}} = \frac{C_o(V_{h\_max} - V_{h\_min})}{t_{on}} \qquad \text{Equation 10}$$

The electronic device 101 may identify a load power ($P_{load}$) based on the identified load current ($I_{load}$), for example, based on Equation 11.

$$P_{load} = I_{load} \times (V_{h\_max} + V_{h\_min})/2 \qquad \text{Equation 11}$$

The electronic device 101 may store the load power ($P_{load}$) identified during charging, and then identify the load power ($P_{load}$) as a load power in a no-load state. In the no-load state, the electronic device 101 may expect a voltage ($V_{RECT}$) in a state in which a load is connected based on a period ($t_{off}$) during which the overvoltage protection operation is stopped and the load power ($P_{load}$) in the no-load state, as described with reference to Equations 4 and 5. The electronic device 101 may obtain the load power ($P_{load}$) in various schemes, and, for example, store the load power ($P_{load}$) identified during charging and then identify the stored load power ($P_{load}$).

Figure 16:
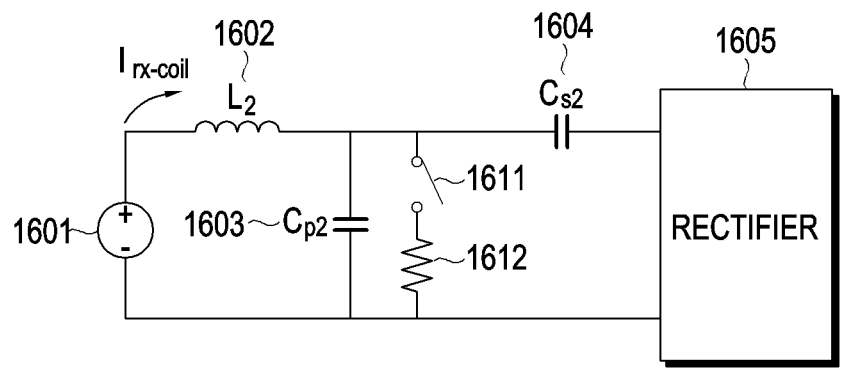
FIG. 16 is a diagram illustrating an example structure of an electronic device for identifying an induced voltage according to an embodiment.

FIG. 16 is a diagram illustrating an example structure of an electronic device for identifying an induced voltage according to an embodiment.

According to an embodiment, an electronic device 101 may include a power source 1601, a coil 1602, capacitors 1603 and 1604, and a rectifier 1605. Components subsequent to the rectifier 1605 are omitted. The electronic device 101 according to an embodiment may further include a switch 1611 and a resistor 1612 connected in parallel with the capacitor 1603. If the switch 1611 is controlled to be in an on state, a current may flow along a closed loop formed by the power source 1601, the coil 1602, and the resistor 1612. An impedance $Z_{L2}$ by the coil 1602 of the electronic device 101 may be, for example, tens to hundreds of ohms [a], a possibility that resonance occurs at the coil 1602 and the capacitor 1603 may decrease, and a magnitude of a current applied to the resistor 1612 as a short circuit may be relatively small. The electronic device 101 may measure a coil current ($I_{RX\_coil}$) based on, for example, an envelope detector connected to the resistor 1612 or an AC measurement circuit which uses an OP-Amp. As an example, the electronic device 101 may measure the voltage applied to the resistor 1612, and may measure the coil current ($I_{RX\_coil}$) in a scheme of dividing the measured voltage by a resistance value of the resistor 1612. The electronic device 101 may identify an induced voltage (Vinci) based on the coil current ($I_{RX\_coil}$), for example, according to Equation 12.

$$V_{ind} = I_{RX\_coil} Z_{L2} \quad \text{Equation 12}$$

As described above with reference to Equation 8, the electronic device 101 may identify the induced voltage ($V_{ind}$) based on an equivalent voltage ($V_{thev\_DC}$). Accordingly, the electronic device 101 may identify the equivalent voltage ($V_{thev\_DC}$) based on the induced voltage (Vinci) identified according to Equation 12. The electronic device 101 may predict a voltage ($V_{RECT}$) in a load connection state based on the equivalent voltage ($V_{thev\_DC}$) in a no-load state and predict whether an overvoltage occurs. Alternatively, the electronic device 101 may identify magnetic field strength using the induced voltage ($V_{in}$) identified based on Equation 12, and perform an operation corresponding to the magnetic field strength. Alternatively, the electronic device 101 may perform an operation corresponding to the equivalent voltage ($V_{thev\_DC}$) during a charging state.

Figure 17:
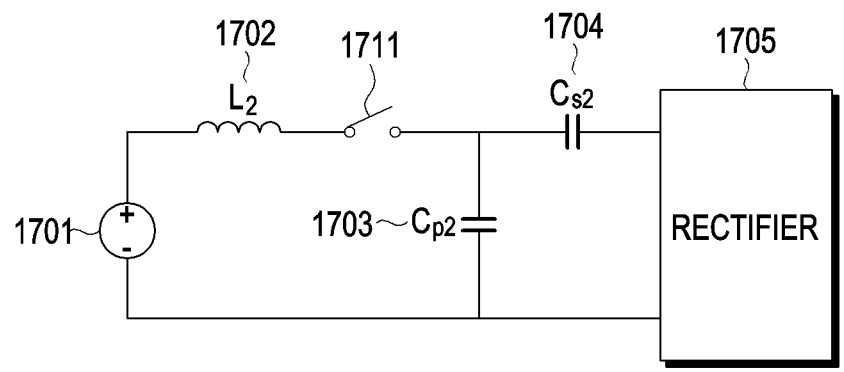
FIG. 17 is a diagram illustrating an example structure of an electronic device for identifying an induced voltage according to an embodiment.

FIG. 17 is a diagram illustrating an example structure of an electronic device for identifying an induced voltage according to an embodiment.

According to an embodiment, an electronic device 101 may be interpreted as including a power source 1701, a coil 1702, capacitors 1703 and 1704, and a rectifier 1705. Components subsequent to the rectifier 1705 are omitted. The electronic device 101 according to an embodiment may further include a switch 1711 connected to the coil 1702. In addition, although not shown in FIG. 17, the electronic device 101 may include a sensor (e.g., a current sensor) connected to both ends of the switch 1711. The electronic device 101 may measure a coil current ($I_{RX\_coil}$) which flows through the coil 1702 based on sensed data from a sensor if the switch 1711 is in an on state. The electronic device 101 may identify an induced voltage (Vinci) based on the measured coil current ($I_{RX\_coil}$) according to Equation 12 described above.

The electronic device 101 may predict a voltage ($V_{RECT}$) in a load connection state based on an equivalent voltage ($V_{thev\_DC}$) in a no-load state and predict whether an overvoltage occurs. The electronic device 101 may identify magnetic field strength using the induced voltage (Vinci) identified based on Equation 12, and perform an operation corresponding to the magnetic field strength. The electronic device 101 may perform an operation corresponding to the equivalent voltage ($V_{thev\_DC}$) during a charging state.

According to various example embodiments of the present disclosure, an electronic device and an operating method thereof may be provided that predicts whether an overvoltage occurs if a load is connected in a state in which the load is not connected. Accordingly, even if the overvoltage is detected in the state in which the load is not connected, if a stability is expected during actual charging, the electronic device may not report an occurrence of the overvoltage to a wireless power transmission device. Accordingly, a situation in which the wireless power transmission device needs to decrease a magnitude of a transmitted power even if the stability during the actual charging is expected may be prevented. In addition, a magnitude of a power output from the wireless power transmission device may not be limited to a range in which the overload does not occur in the state in which the electronic device is not connected to the load, and may be limited to a range in which the overvoltage does not occur in a state in which the electronic device is actually connected to the load.

An electronic device according to various embodiments of the present disclosure may be one of various types of electronic devices. The electronic device may include, for example, and without limitation, a portable communication device (e.g., a smart phone), a computer device, a portable multimedia device, a portable medical device, a camera, a wearable device, a home appliance, or the like. According to an embodiment of the present disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., wiredly), wirelessly, or via a third component.

As used herein, the term "module" may include a unit implemented in hardware, software, or firmware, or any combination thereof, and may interchangeably be used with other terms, for example, "logic," "logic block," "part," or "circuitry", and/or the like. A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., a program) including one or more instructions that are stored in a storage medium (e.g., an internal memory or an external memory) that is readable by a machine (e.g., a master device or a device performing tasks). For example, a processor of the machine (e.g., the master device or the device performing the tasks) may invoke at least one of the one or more instructions stored in the storage medium, and execute it. This allows the machine to be operated to perform at least one function according to the at least one instruction invoked. The one or more instructions may include a code made by a complier or a code executable by an interpreter. The machine-readable storage medium may be provided in the form of a non-transitory storage medium. Herein, the "non-transitory" storage medium is a tangible device, and may not include a signal (e.g., an electromagnetic wave), but this term does not differentiate between a case that data is semi-permanently stored in the storage medium and a case that the data is temporarily stored in the storage medium.

According to various embodiments, a method according to embodiments of the present disclosure may be included and provided in a computer program product. The computer program product may be traded as commodities between sellers and buyers. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or a plurality of entities. According to various embodiments, one or more of the above-described components may be omitted, or one or more other components may be added. Alternatively or additionally, a plurality of components (e.g., a module or a program) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood to one of ordinary skill in the art that various changes in form and detail may be made without departing from the true spirit and full scope of the disclosure, including the appended claims and their equivalents.

What is claimed is:

1. An electronic device, comprising:
   a battery;
   a resonance circuit configured to wirelessly receive power;
   a rectifier configured to rectify an alternating current (AC) power provided from the resonance circuit into a direct current (DC) power;
   a DC/DC converter configured to convert the DC power provided from the rectifier to output a converted power;
   a charger configured to charge the battery using the converted power provided from the DC/DC converter;
   a switch configured to connect the rectifier and the DC/DC converter to be provided the DC power from the rectifier in an on state or disconnect the rectifier and the DC/DC converter not to be provided the DC power from the rectifier in an off state, wherein the switch is in the off state before the charging is started by the charger;
   an overvoltage protection circuit configured to perform an overvoltage protection operation based on a voltage at an output terminal of the rectifier being greater than or equal to a first threshold voltage, and to stop the overvoltage protection operation based on the voltage at the output terminal of the rectifier being less than or equal to a second threshold voltage after the overvoltage protection operation is performed;
   a control circuit; and
   a communication circuit,
   wherein while the switch is in the off state, the control circuit is configured to:
   based on a periodic repetition of a performance of the overvoltage protection operation and a stop of the overvoltage protection operation, identify a first period during which the overvoltage protection operation is stopped;
   based on the first period, identify an expected voltage at an output terminal of the rectifier, to be expected, wherein the expected voltage is a voltage at the output terminal of the rectifier if the switch is in the on state;
   based on the expected voltage, identify whether or not an occurrence of an overvoltage is expected if the switch is in the on state; and
   control the communication circuit to transmit a communication signal including information about whether or not the occurrence of the overvoltage is expected if the switch is in the on state.

2. The electronic device of claim 1, wherein, as at least part of identifying the expected voltage at the output terminal of the rectifier, the control circuit is configured to:
   identify a predetermined relation between the first period and the expected voltage at the output terminal of the rectifier; and
   based on the predetermined relation, identify the expected voltage at the output terminal of the rectifier.

3. The electronic device of claim 1, wherein, as at least part of identifying the expected voltage at the output terminal of the rectifier, the control circuit is configured to:
   identify a power corresponding to a load of the electronic device; and
   based on the first period and the identified power corresponding to the load of the electronic device, identify the expected voltage at the output terminal of the rectifier.

4. The electronic device of claim 3, wherein, as at least part of identifying the power corresponding to the load of the electronic device, the control circuit is configured to:
- based on a voltage of the battery and a current set in the charger, identify the power corresponding to the load of the electronic device.

5. The electronic device of claim 4, wherein, as at least part of identifying the power corresponding to the load of the electronic device, the control circuit is configured to:
- identify a power of the battery based on a product of the voltage of the battery and the current set in the charger as the power corresponding to the load of the electronic device, or identify a sum of the power of the battery and a rated power of at least one other hardware of the electronic device as the power corresponding to the load of the electronic device.

6. The electronic device of claim 3, wherein, as at least part of identifying the power corresponding to the load of the electronic device, the control circuit is configured to:
- identify a value identified and stored while the electronic device charges the battery or a default value as the power corresponding to the load of the electronic device.

7. The electronic device of claim 6, wherein, as at least part of identifying the value identified and stored while the electronic device charges the battery as the power corresponding to the load of the electronic device, the control circuit is configured to:
- identify the stored value based on a product of an average value of the first threshold voltage and the second threshold voltage and a current corresponding to the load identified while the battery is charged, and
- wherein the current corresponding to the load is identified based on a second period during which the overvoltage protection operation is performed based on the periodic repetition of the performance of the overvoltage protection operation and the stop of the overvoltage protection operation while the battery is charged.

8. He electronic device of claim 1, wherein, as at least part of identifying the first period, the control circuit is configured to:
- identify the first period based on a first signal which causes the performing of the overvoltage protection operation and/or a second signal which causes the stopping of the overvoltage protection operation,
- identify the first period based on at least one interruption occurring in response to an occurrence and/or a stop of the first signal and/or the second signal, or
- identify the first period based on a sampling result of the first signal and/or the second signal.

9. The electronic device of claim 1, wherein, as at least part of identifying the first period, the control circuit is configured to:
- obtain a waveform of the voltage at the output terminal of the rectifier; and
- identify the first period based on a sampling result for a second peak point of the waveform from a first peak point of the waveform.

10. The electronic device of claim 1, wherein, as at least part of controlling the communication circuit to transmit the communication signal including the information about whether or not the occurrence of the overvoltage is expected if the switch is in the on state, the control circuit is configured to:
- based on the occurrence of the overvoltage being expected, control the communication circuit to transmit a first communication signal including information indicating that the occurrence of the overvoltage is expected and/or information indicating that the overvoltage occurs; and
- based on the occurrence of the overvoltage not being expected, control the communication circuit to transmit a second communication signal including information indicating that the occurrence of the overvoltage is not expected and/or information indicating that the overvoltage does not occur, or suspend the transmitting of the first communication signal.

* * * * *